US005187692A

United States Patent [19]

Haneda et al.

[11] Patent Number: 5,187,692

[45] Date of Patent: Feb. 16, 1993

[54] ACOUSTIC TRANSFER FUNCTION SIMULATING METHOD AND SIMULATOR USING THE SAME

[75] Inventors: Yoichi Haneda, Chofu; Shoji Makino, Muchida; Yutaka Kaneda, Tanashi, all of Japan

[73] Assignee: Nippon Telegraph and Telephone Corporation, Tokyo, Japan

[21] Appl. No.: 856,654

[22] Filed: Mar. 20, 1992

[30] Foreign Application Priority Data

Mar. 25, 1991 [JP] Japan .................................. 3-60538

[51] Int. Cl.[5] ........................ G01S 15/00; G01K 15/00

[52] U.S. Cl. .................................... 367/135; 367/901; 364/574

[58] Field of Search ................ 367/901, 135; 364/574, 364/724.17, 724.19, 806; 381/94, 71; 379/390

[56] References Cited

U.S. PATENT DOCUMENTS

| | | | |
|---|---|---|---|
| 4,600,815 | 7/1986 | Horna | 379/390 |
| 4,683,590 | 7/1987 | Miyoshi et al. | 381/71 |
| 4,747,132 | 5/1988 | Ibaraki et al. | 379/390 |

OTHER PUBLICATIONS

"Inverse Filtering of Room Acoustics" by M. Miyoshi et al IEEE Trans. on Acoustics, Speech & Signal Proc., vol. 36, No. 2, Feb. '88, pp. 145-152.

*Primary Examiner*—Daniel T. Pihulic
*Attorney, Agent, or Firm*—Pollock, Vande Sande and Priddy

[57] ABSTRACT

A plurality of acoustic transfer functions for a plurality of sets of different positions of a loudspeaker and a microphone in an acoustic system are measured by an acoustic transfer function measuring part. The plurality of measured acoustic transfer functions are used to estimate poles of the acoustic system by a pole estimation part, and a fixed AR filter is provided with the estimated poles as fixed values. A variable MA filter is connected in series to the fixed AR filter and the acoustic transfer function of the acoustic system is simulated by the two filters. The filter coefficients of the variable MA filter are modified with a change in the acoustic transfer function of the acoustic system.

13 Claims, 9 Drawing Sheets

ACOUSTIC TRANSFER FUNCTION SIMULATING METHOD AND SIMULATOR USING THE SAME

BACKGROUND OF THE INVENTION

The present invention relates to an acoustic transfer function simulating method which is used with an acoustic echo canceller, a sound image localization simulator, an acoustic device which requires the simulation of an acoustic transfer function for dereverberation, active noise control, etc., and an acoustic signal processor, for simulating the transmission characteristics of a sound between a source and a receiver. The invention also pertains to a simulator utilizing the above-mentioned method.

The acoustic transfer function simulating method is a method which simulates, by use of a digital filter, the transmission characteristics of a sound between a source and a receiver placed in an acoustic system (e.g. a sound field). In this specification, the transfer function of the acoustic system is expressed by a true acoustic transfer function H(z), and the transfer function that is simulated by the acoustic transfer function simulating method will hereinafter be referred to as a simulation transfer function H'(z). Incidentally, the following description will be given on the assumption that signals are all discrete-time signals, but in the case of continuous-time signals, too, discussions on the discrete-time signals are equally applicable. In the discrete-time signal its time domain is expressed by, for example, x(t) using an integer parameter t representing discrete time, and its frequency domain by X(z) using a z-transform. Furthermore, an A/D converter and a D/A converter which are used, as required, in the acoustic transfer function simulator described hereinbelow are self-evident, and hence no description will be given of them, for the sake of brevity.

FIG. 1A is a schematic diagram for explaining the true acoustic transfer function H(z) in a room. In the case where a sound source (for example, a loudspeaker) 12 and a receiver (for instance, a microphone) 13 are disposed in a sound field 11 and a signal X(z) is applied to an input end 14 to output the signal X(z) from the sound source 12, the signal X(z) will reach the receiver 13 under the influence of the true acoustic transfer function H(z) in the room 11. A signal Y(z) received by the receiver 13 is output via an output end 15. The true acoustic transfer function H(z) describes the input-output relationship of the output signal Y(z) at the output end 15 to the input signal X(z) at the input end 14, and it is expressed as follows:

$$H(z)=Y(z)/X(z) \qquad (1)$$

The true acoustic transfer function H(z) differs with different positions of the sound source 12 and the receiver 13 even in the same room.

The simulation of the acoustic transfer function is to simulate the true acoustic transfer function H(z) which is the above-mentioned signal input-output relationship, by use of an electrical filter or the like. FIG. 1B is a schematic diagram for explaining it. The transfer function of a filter 16 is the simulated transfer function H'(z). In the case where the simulated transfer function H'(z) is equal to the true acoustic transfer function H(z) in FIG. 1A, when applying the same signal as that X(z) at the input end 14 in FIG. 1A to an input end 17 of the filter 16, an output signal Y'(z), which is provided an output end 18 via the filter 16 having the simulation transfer function H'(z), becomes equal to the signal Y(z) at the output end 15 in FIG. 1A.

The acoustic transfer function simulating method that has been employed most widely in the past is a method of simulating the true acoustic transfer function H(z) by a model called moving average model (MA model) or all zero model. In the case of utilizing the MA model, the simulation transfer function $H'_{MA}(z)$ is expressed as follows:

$$H'_{MA}(z) = \sum_{n=0}^{L} h'(n) \cdot z^{-n} \qquad (2)$$

A filter embodying the transfer function expressed by Eq. (2) will hereinafter be referred to as an MA filter. Further, h'(n) in Eq. (2) will hereinafter be referred to as MA coefficients and N an MA filter order. It is well-known in the art that the MA filter could be implemented through utilization of an FIR (Finite Impulse Response) filter.

It is well-known in the art that the input-output relationship in the time domain in the case of using the MA filter is expressed using the MA coefficients $h'_n$ as follows:

$$y'(t) = \sum_{n=0}^{L} h'(n) \cdot x(t-n) \qquad (3)$$

where x(t) is the input signal and y'(t) the output signal.

FIG. 1C is a schematic diagram for explaining the acoustic transfer function simulating method utilizing the MA filter. The MA filter 19 has the MA coefficients h'(n) as its filter coefficients. Letting an impulse response of the true acoustic transfer function H(z) be represented by h(t) and letting the MA filter coefficients $h'_n = h(n)$, a simulation with a minimum error is achieved as is well-known in the art.

Incidentally, the simulation of the acoustic transfer function H(z) through use of the MA filter generally calls for the filter order corresponding to the reverberation time of a room, and hence has a shortcoming that the scale of the system used is large. Moreover, the true acoustic transfer function H(z) varies with the positions of the sound source and the receiver as referred to previously—this poses a problem that all MA filter coefficients have to be modified accordingly. For instance, in an acoustic echo canceller which has to estimate and simulate an unknown acoustic transfer function at high speed, it corresponds to the re-estimation of all the coefficients of the MA filter forming an estimated echo path, leading to serious problems such as impaired echo return loss enhancement (ERLE) by a change in the acoustic transfer function and slow convergence by the adaptation of all the MA filter coefficients.

Next, a description will be given of another conventional simulation method which performs simulation of the true acoustic transfer function by a model called autoregressive moving average model (ARMA model) or pole-zero model. In the case of utilizing the ARMA model, the simulation transfer function $H'_{ARMA}(z)$ is expressed as follows:

$$H'_{ARMA}(z) = \frac{\sum_{n=0}^{Q} b'_n z^{-n}}{1 - \sum_{n=1}^{P} a'_n z^{-n}} \quad (4)$$

$$= \frac{C z^{-Q_1} \prod_{i=1}^{Q_2} (1 - Z_{e'i} z^{-1})}{\prod_{i=1}^{P} (1 - Z_{p'i} z^{-1})} \quad (5)$$

In the above, $Q = Q_1 + Q_2$. A filter which embodies the transfer function $H'_{ARMA}(z)$ expressed by Eq. (4) or (5) will hereinafter be referred to as an ARMA filter. Letting the denominators and the numerators in Eqs. (4) and (5) be represented by A'(z) and B'(z), respectively, a filter which embodies a transfer function expressed by B'(z) will hereinafter be referred to as a MA filter. Since B'(z) is expressed in the same form as that by Eq. (2) based on the afore-mentioned MA model, the both filters will hereinafter be referred to under the same name unless a confusion arises between them. Further, a filter which embodies a transfer function expressed by 1/A'(z) will hereinafter be referred to as an AR filter. Moreover, filters which embody transfer functions A'(z) and (1−A'(z)) will also be referred to as AR filters, but they will be called an A'(z) type AR filter and a (1−A'(z)) type AR filter, respectively. $a'_n$ and $b'_n$ in Eq. (4) will be called AR coefficients and MA coefficients, respectively, and these coefficients, put together, will be called ARMA coefficients. P and Q in Eq. (4) will hereinafter be called an AR filter order and an MA filter order, respectively. Eq. (5) represents, in factorized form, polynomials of the denominator and the numerator in Eq. (4), and $Z_{e'i}$ is called zero for making the transfer function $H'_{ARMA}(z)$ to zero, and $Z_{p'i}$ pole for making the transfer function $H'_{ARMA}(z)$ infinite. This ARMA filter can be realized through utilization of an IIR (infinite impulse response) filter.

As will be seen from the relationship between Eqs. (4) and (5), once the AR and MA coefficients which provide the polynomials in the denominators and the numerators are determined, factors of the polynomials are unequivocally determined; hence, it can be said that the poles and the zeros have a one-to-one correspondence with the AR coefficients and the MA coefficients, respectively. As is well-known in the art, the input-output relationship in the case of employing the ARMA filter can be expressed using the AR coefficients $a'_n$ and the MA coefficients $b'_n$ as follows:

$$y'(t) = \sum_{n=1}^{P} a'_n y'(t-n) + \sum_{n=0}^{Q} b'_n x(t-n) \quad (6)$$

where x(t) is the input signal and y'(t) the output signal.

Now, the simulation transfer function expressed by Eqs. (4) and (5) can be expressed as follows:

$$H'_{ARMA}(z) = B'(z)/A'(z) = B'(z)\{1/A'(z)\}$$

FIG. 1D shows an example of an arrangement for simulating the transfer function by use of the ARMA filter, which is a series-connection of an AR filter 21 having the 1/A'(z) characteristics and an MA filter 22 having the B'(z) characteristics. The AR filter 21 and the MA filter 22 may also be exchanged in position.

Next, a description will be given of two typical methods for obtaining the ARMA coefficients $a'_n$ and $b'_n$ necessary for a good simulation of the true acoustic transfer function. A first one of them is a method for obtaining the ARMA coefficients from values of zeros and poles, and a second method is a method of calculating the ARMA coefficients from the input-output relationship through use of a normal equation (a Wiener-Hopf equation). The second method includes a method of determining the ARMA coefficients by solving the Wiener-Hopf equation through use of measured values of the output signal y(t) based on a given input signal x(t), and a method of similarly calculating the ARMA coefficients by solving the Wiener-Hopf equation by use of measured values of an impulse response which represents a temporal or time-varied input-output relationship between the input signal x(t) and the output signal y(t). (In the following description the calculation of the ARMA coefficients from the input-output relationship or the measured values of the impulse response will be called ARMA modeling.)

According to the first method, in the case where, letting the number of zeros, the number of poles, each zero in the z-plane and each pole in the z-plane be represented by Q, P, $Z_{ei}$ (i=1, 2, 3, . . . , Q) and $Z_{pi}$ (i=1, 2, 3, . . . , P), respectively, values of zeros and poles can be calculated on the basis of an acoustic theory or the like through utilization of geometrical and physical conditions of the sound field, such as its shape, dimensions, reflectivity, etc., these values are substituted into Eq. (5) to expand it to the form of Eq. (4), thereby determining the AR and MA coefficients $a'_n$ and $b'_n$. In practice, however, it is only for very simple sound field that the values of zeros and poles can be calculated on the basis of the acoustic theory. In many cases it is difficult to obtain the values of zeros and poles through theoretical calculations alone.

According to the second method (ARMA modeling), for example, in the acoustic system 11 of FIG. 1A wherein the sound source 12 and the receiver 13 are disposed, the output signal y(t) from the receiver 13 is measured when the input signal x(t), for example, white noise of a "zero" average amplitude, is applied to the sound source 12. Let it be assumed, here, that the input-output relationship is described as shown in Eq. (6). The numbers of zeros and poles are predetermined, taking into account the transfer function to be simulated and the required simulation accuracy. Now, if the difference between a simulation output signal y'(t) of the ARMA filter and a true output signal y(t) becomes minimum in some sense, then it can be considered that an excellent simulation of the acoustic transfer function by use of the ARMA filter could be achieved. It is possible to employ a well-known method of solving the Wiener-Hopf equation for obtaining ARMA coefficients which minimize an expected values of a squared error, given by the following Eq. (7), between the simulation output signal y'(t) of the ARMA filter and the true output signal y(t):

$$e(t)^2 = \{y(t) - y'(t)\}^2 \quad (7)$$

Letting an expected value operator be represented by E[.], the expected value $\epsilon$ of the squared error in Eq. (7) can be expressed, by use of Eq. (6), as follows:

$$\epsilon = E[e(t)^2]$$

-continued $$= E\left[\left\{ y(t) - \sum_{n=1}^{P} a'_n y'(t-n) - \sum_{n=0}^{Q} b'_n x(t-n) \right\}^2\right] \quad (8)$$

The expected value ε of the square error becomes minimum when all derivatives, obtained by partially differentiating the expected value ε with respect to the coefficients $a'_n$ (n=1, 2, 3, . . . , P) and $b'_n$ (n=0, 1, 2, 3, . . . , Q), become zeros at the same time. Since in Eq. (8) the value of the output signal y'(t) cannot be obtained before the values of the coefficients $a'_n$ and $b'_n$ are determined, however, the expected value of the square error is minimized replacing the simulation output signal y'(t) with the true output signal y(t). This is an ordinary method called "equation error method."

Derivatives of the coefficients $a'_n$ and $b'_n$ in Eq. (8) become as follows:

$$\frac{\partial\epsilon}{\partial a'_n} = 2E\left[ y(t)y(t-n) - \sum_{n=1}^{P} a'_m y(t-m)y(t-n) - \sum_{m=0}^{Q} b'_m x(t-m)y(t-n) \right] n = 1, 2, 3, \ldots, P$$

$$\frac{\partial\epsilon}{\partial b'_n} = 2E\left[ y(t)x(t-n) - \sum_{m=1}^{P} a'_m y(t-m)x(t-n) - \sum_{m=0}^{Q} b'_m x(t-m)x(t-n) \right] n = 0, 1, 2, \ldots, Q \quad (9)$$

By solving the simultaneous equations (normal equations) so that the derivatives become zero at the same time, values of the ARMA coefficients $a'_n$ and $b'_n$ can be obtained. In this instance, the expected value operation cannot be done infinitely, and hence is replaced by an average for a sufficiently long finite period of time.

RLS, LMS and normalized LMS methods which are adaptive algorithms, as well as the above-described method involving normal equations can be used to determine the ARMA coefficients for the simulation with a minimum squared error.

Next, a description will be given of another second method according to which an impulse signal is applied as the input signal x(t) to the sound source, the response signals are measured and then the ARMA coefficients are determined. The impulse response is a signal which is observed in the receiver when a unit impulse δ(t) is applied as the input signal x(t) to the sound source. The unit impulse δ(t) takes values 1 and 0 when t=0 and t≠0, respectively. The MA model utilizes the impulse response intact for simulating the acoustic transfer function, but since the ARMA model is used to simulate the acoustic transfer function in this case, the ARMA coefficients are determined on the basis of the measured impulse response.

Once the impulse response of the acoustic system is found, the input-output relationship, i.e. the relationship between the input signal x(t) to the sound source and the observed signal y(t) in the receiver can be defined, and hence it is possible to employ Eq. (9) which is basically applicable to any given input signal x(t). Substituting the unit impulse δ(t) for x(t) and the time series h(t) of the measured impulse response for y(t) in Eq. (9) gives $$\frac{\partial\epsilon}{\partial a'_n} = 2E\left[ h(t)h(t-n) - \sum_{m=1}^{P} a'_m h(t-m)h(t-n) - \sum_{m=0}^{Q} b'_m \delta(t-m)h(t-n) \right] n = 1, 2, 3, \ldots, P$$

$$\frac{\partial\epsilon}{\partial b'_n} = 2E\left[ h(t)\delta(t-n) - \sum_{m=1}^{P} a'_m h(t-m)\delta(t-n) - \sum_{m=0}^{Q} b'_m \delta(t-m)\delta(t-n) \right] n = 0, 1, 2, \ldots, Q \quad (10)$$

By solving the simultaneous equations (i.e. normal equations) so that the derivatives become zero at the same time, values of the ARMA coefficients $a'_n$ and $b'_n$ can be obtained. The expected value operation with the operator E[.] in this instance is, for example, an averaging operation corresponding to the measured impulse response length which corresponds to L in Eq. (w).

The second conventional methods which simulate the acoustic transfer function by use of the ARMA filter described above are advantageous in that the orders of filters used are lower than in the first conventional method using only the MA filter. In other words, the use of N in Eq. (w) and P and Q in Eq. (4) provides the relationship $P+Q<N$, in general—this affords reduction of the computational load, and hence diminishes the scale of apparatus. With the second conventional methods, however, it is also necessary to change all ARMA coefficients when the positions of the sound source and the receiver are changed, as in the case of the first traditional method. Moreover, the method of adaptively estimating both of the AR and MA coefficients requires an adaptive algorithm which needs a large computational power for increasing the convergence speed to some extent, as compared with the method of estimating only the MA coefficients.

FIG. 2 is a block diagram schematically showing, as a first example of a conventional acoustic transfer function simulator, a conventional acoustic echo canceller (hereinafter referred to as an echo canceller) which employs an adaptive MA filter (i.e. an FIR filter) as disclosed in Japanese Patent Application Laid Open No. 220530/89, for example. In a hands-free telecommunication between remote stations via a network of transmission lines, such as a video teleconferencing service, a received input signal x(t) to an input terminal 23 from the far-end station is reproduced from a loudspeaker 24. On the other hand, the caller's speech is received by a microphone 25, from which it is sent out as a transmission signal to the remote or called station via a signal output terminal 26. The echo canceller is employed to prevent that the received input signal reproduced by the loudspeaker 24 is received by the microphone 25 and transmitted together with the transmission signal (that is, to prevent an acoustic echo).

To cancel such an acoustic echo, an acoustic transfer function simulation circuit 28 is formed using an adaptive MA filter 27, the acoustic transfer function H(z) between the loudspeaker 24 and the microphone 25 is simulated by the simulation circuit 28, and the received input signal x(t) at the input terminal 23 is applied to the acoustic transfer function simulation circuit 28 to create a simulated echo y'(t), which is used to cancel the acoustic echo y(t) received by the microphone 25 in a signal subtractor 29. Since the acoustic transfer function H(z) varies with a change in the position of the microphone 25, for instance, it is necessary to perform an adaptive estimation and simulation through use of the adaptive MA filter 27. That is, a square error between the simulated echo y'(t) at the output of the simulation circuit 28 and the acoustic echo y(t) received by the microphone 25 is obtained by the subtractor 29 and the coefficients of the MA filter 27 are adaptively calculated by a coefficient calculator 30 so that the square error may be minimized.

As mentioned previously, however, the echo canceller is defective in that the device scale become inevitably large because of large filter orders and that all filter coefficients must be changed with a variation in the acoustic transfer function.

FIG. 3 shows, as another example of the conventional acoustic echo canceller, the construction of an echo canceller employing a series-parallel type adaptive ARMA filter. In this instance, the output from the microphone 25 supplied with an acoustic output signal or acoustic echo is applied to an adaptive AR filter 31, the output of which is added by an adder 31A to the output of an adaptive MA filter 32, and the added output is provided as the simulated echo output to the subtractor 29. That is, the acoustic transfer function simulation circuit 28 is formed as a series-parallel type ARMA filter by the $(1-A'(z))$ type adaptive AR filter 31 which is series to the acoustic system 11 and the adaptive MA filter 32 which is parallel to the acoustic system 11. The ARMA filter is described as a means for obtaining the ARMA filter output when y'(t) on the right-hand side of Eq. (6) is replaced by y(t), and the AR filter 31 is formed by an AR filter having the $(1-A'(z))$ characteristics. The coefficients of the AR and MA filters 31 and 32 are adaptively calculated by coefficient calculators 30A and 30B so that the error of the subtractor 29 may be minimized. It is also possible to constitute an echo canceller by substituting the above-mentioned series-parallel type ARMA filter with a so-called parallel type ARMA filter, that is, by providing in parallel to the acoustic system an ARMA filter formed by a series-connection of an AR filter 33 having the $1/A'(z)$ characteristic and the MA filter 32 as shown in FIG. 4.

The circuit constructions utilizing such adaptive ARMA filters as shown in FIGS. 3 and 4 are advantageous over the circuit construction employing only the adaptive MA filter 27 shown in FIG. 2 in that the orders of the filters can be decreased or lowered, and hence the scale of calculation of the coefficients in the coefficient calculators 30A and 30B can be reduced. However, the algorithm for simultaneously estimating the MA and AR coefficients in real time is so complex that the above-noted echo cancellers are not put to practical use at present.

A second example of the conventional acoustic transfer function simulator, to which the present invention pertains, is a sound image localization simulator. The sound image localization simulator is a device which enables a listener to localize a sound image at a given position while the listener is listening through headphones. The principle of such a sound image localization simulator will be described with reference to FIG. 5. In FIG. 5, when the signal X(z) is applied to a loudspeaker 34, an acoustic signal therefrom reaches right and left ears of a listener 35 while being subjected to acoustic transmission characteristics $H_R(z,\theta)$ and $H_L(z,\theta)$ between the loudspeaker 34 and the listener's ears. In other words, the listener 35 listens to a signal $H_R(z,\theta)X(z)$ by the right ear and a signal $H_L(z,\theta)X(z)$ by the left ear. The acoustic transfer characteristics $H_R(z,\theta)$ and $H_L(z,\theta)$ are commonly referred to as head-related transfer functions (HRTFs), and the difference in hearing between the right and left ears, that is, the difference between $H_R$ and $H_L$ constitutes an important factor for humans to perceive the sound direction.

The sound image localization simulator simulates the acoustic transmission characteristics from the sound source to receivers 36R and 36L inserted in listener's external ears as shown in FIG. 5. Signals received by the receivers 36R and 36L in the listener's external ears are equivalent to sounds the listener listens with the eardrums. The sound image localization simulator can be implemented by inserting the receivers 36R and 36L in the external ears, measuring the head-related transfer functions $H_R(z,\theta)$ and $H_L(z,\theta)$ and reproducing the head-related transfer functions by use of a filter. In FIG. 5 the loudspeaker 34 is disposed in front of the listener 35 at an angle $\theta$ to the listener. Applying the signal X(z) from a head-related transfer function measuring device 37 to the loudspeaker 34, the acoustic signal from the loudspeaker 34 reaches the receivers 36R and 36L while being subjected to the acoustic transmission characteristics $H_R(z,\theta)$ and $H_L(z,\theta)$ between the loudspeaker 34 and the listener's ears as referred to above. The head-related transfer function measuring device 37 measures, for example, impulse responses $h'_R(n,\theta)$ and $h'_L(n,\theta)$ of head-related transfer functions $H'_R(z,\theta)$ and $H'_L(z,\theta)$. In this way, sets of impulse response $h'_R(n,\theta)$ and $h'_L(n,\theta)$ of the head-related transfer functions $H'_R(z,\theta)$ and $H'L(z,\theta)$ are measured for a required number of different angles $\theta$. The sets of the impulse responses thus measured are each stored in a memory 38 in correspondence with one of the angles $\theta$.

In the case of supplying a listener 35' with the signal X(z) from a sound source assumed to be disposed in the direction of a desired angle $\theta$ in FIG. 5, an angular signal represented by the same character $\theta$ is applied to an input terminal 39 together with the input signal X(z). The angular signal $\theta$ is applied as an address to the memory 38, from which is read out the set of impulse response $h'_R(n,\theta)$ and $h'_L(n,\theta)$ corresponding to the angle $\theta$. The impulse responses thus read out are set as filter coefficients in filters 40R and 40L, to which the signal X(z) is applied. Consequently, the listener 35' listens to a signal $Y'_R(z,\theta)=H'_R(z,\theta)X(z)$ by the right ear and a signal $Y'_L(z,\theta)=H'_L(z,\theta)X(z)$ by the left ear through headphones 41R and 41L. If the simulated transfer functions are sufficiently accurate, then it holds that $H'_R \simeq H_R$ and $H'_L \simeq H_L$, that is, $Y'_R \simeq Y_R$ and $Y'_L \simeq Y_L$. This agrees with the listening condition described above in respect of FIG. 5, and the listener listening through the headphones 41R and 41L localizes the sound source in the direction of the angle $\theta$. In other words, the simulation circuit 28 made up of the filters 40R and 40L simulates the head-related transfer functions. In the case of reading out of the memory 38 the impulse response $h'_R(n,\theta)$ and $h'_L(n,\theta)$ corresponding to the desired angle $\theta$, it is also possible to apply the angle $\theta$ from the outside by detecting, for example, the positional relationship between the sound source and the listener 35'.

The head-related transfer function described above appreciably varies with the direction $\theta$ of the sound source as a matter of course. To localize sound images in various directions, it is necessary to measure the head-related transfer function in a number of directions and store the measured data, and the storage of such a large amount of data measured constitutes an obstacle to the practical use of devices of this kind. That is, the formation of the filters 40A and 40L by the conventional acoustic transfer function simulating method poses a problem that the quantity of stored data on the acoustic transfer function is extremely large.

FIG. 6 shows a conventional dereverberator as a third example of the conventional acoustic transfer function simulator to which the present invention pertains. The signal X(z) emitted from the loudspeaker 24 disposed in the room 11 is influenced by transmission characteristics $H_1(z)$ and $H_2(z)$ of the room and received by receivers $\mathbf{25}_1$ and $\mathbf{25}_2$. The thus received signals are expressed by $H_1(z)X(z)$ and $H_2(z)X(z)$, respectively. The signal that is influenced by the acoustic transmission characteristics of the room is called "reverberant signal" and the object of the dereverberator is to restore or reconstruct the original signal X(z) from the received signal.

Heretofore there have been proposed a variety of dereverberators, and the device shown in FIG. 6 is based on a method disclosed in M. Miyoshi and Y. Kaneda, "Inverse filtering of room acoustics," IEEE Trans. on Acoust., Speech and Signal Proc., Vol. ASSP-36, No. 2, pp. 145–152, 1988. This method is based on the fact that if the acoustic transmission characteristics $H_1(z)$ and $H_2(z)$ are measurable and can be represented as the MA model, then MA filters $G_1(z)$ and $G_2(z)$ exist which satisfy the following equation:

$$G_1(z)H_1(z)+G_2(z)H_2(z)=1 \tag{11}$$

With the Miyoshi et al arrangement, an acoustic transmission characteristics measuring part 44 applies a predetermined signal X(z) to the loudspeaker 24 and measures the transfer functions $H_1(z)$ and $H_2(z)$ from the signals received by the microphones $\mathbf{25}_1$ and $\mathbf{25}_2$. In a coefficient calculating part 45 the MA filter characteristics $G_1(z)$ and $G_2(z)$ which satisfy Eq. (11) are calculated using the transmission characteristics $H_1(z)$ and $H_2(z)$, and they are set in dereverberating MA filters $\mathbf{42}_1$ and $\mathbf{42}_2$. Thereafter, an arbitrary signal X(z) is applied to the loudspeaker 24, the resulting outputs of the receivers $\mathbf{25}_1$ and $\mathbf{25}_2$ are supplied to the MA filters $\mathbf{42}_1$ and $\mathbf{42}_2$ and their outputs are added by an 20 adder 43 to obtain the following output signal Y(z):

$$\begin{aligned} Y(z) &= G_1(z)H_1(z)X(z) + G_2(z)H_2(z)X(z) \\ &= \{G_1(z)H_1(z) + G_2(z)H_2(z)\}X(z) \\ &= X(z) \end{aligned} \tag{12}$$

Thus, the dereverberated original signal X(z) is reconstructed. The filters $\mathbf{42}_1$ and $\mathbf{42}_2$ which have the transmission characteristics $G_1(z)$ and $G_2(z)$ serve as filters the characteristics of which are inverse from the transmission characteristics $H_1(z)$ and $H_2(z)$, and the filters $\mathbf{42}_1$ and $\mathbf{42}_2$ and the adder 43 constitutes the simulation circuit 28 which simulates reverberation-free transmission characteristics with respect to the acoustic system 11. The coefficients of the inverse filters $\mathbf{42}_1$ and $\mathbf{42}_2$ need not be changed from their initialized values unless the sound field in the room 11 changes, but they must be modified adaptively when the sound field is changed.

A difficulty in this method lies in that the computational load necessary for deriving the filter characteristics $G_1(z)$ and $G_2(z)$ from the transmission characteristics $H_1(z)$ and $H_2(z)$ in the coefficient calculating part 45, and the computational load in this case increases in proportion to the square of the order of the transmission characteristics $H_1(z)$ and $H_2(z)$ (corresponding to L in Eq. (2)).

FIG. 7 shows, as a fourth example of the conventional acoustic transfer function simulator to which the present invention pertains, a conventional active noise controller for indoor use disclosed in U.S. Pat. No. 4,683,590, for example. Noise radiated from a noise source 46 in the sound field 11 is collected by the receiver 25 near the noise source 46. The acoustic signal X(z) thus collected is phase inverted by a phase inverter 47 to provide a signal −X(z), which is applied to each of filters $\mathbf{48}_1$ and $\mathbf{48}_2$ of transmission characteristics $C_1(z)$ and $C_2(z)$. The outputs of the filters $\mathbf{48}_1$ and $\mathbf{48}_2$ are provided to secondary sound sources $\mathbf{24}_1$ and $\mathbf{24}_2$, respectively, from which they are output as control sounds. Observed at a control point P is the sum of three signals of a noise signal $H_0(z)X(z)$ influenced by the room acoustic characteristics $H_0(z)$, an output signal $-H_1(z)C_1(z)X(z)$ of the secondary sound source $\mathbf{24}_1$ influenced by the room acoustic Characteristics $H_1(z)$ and an output signal $-H_2(z)C_2(z)X(z)$ of the secondary sound source $\mathbf{24}_2$ influenced by the acoustic characteristics $H_2(z)$ of the sound field. That is, the observed signal E(z) is expressed as follows:

$$\begin{aligned} E(z) &= H_0(z)X(z) - H_1(z)C_1(z)X(z) - H_2(z)C_2(z)X(z) \\ &= \{H_0(z) - H_1(z)C_1(z) - H_2(z)C_2(z)\}X(z) \end{aligned} \tag{13}$$

At this time, filter coefficients $C_1(z)$ and $C_2(z)$ exist which satisfy the following equation, and consequently, the observed signal E(z) can be reduced to zero and noise control is thus effected.

$$H_1(z)C_1(z)+H_2(z)C_2(z)=H_0(z) \tag{14}$$

To perform this, signals are sequentially applied from the acoustic transmission characteristics measuring part 44 to the secondary sound sources $\mathbf{24}_1$ and $\mathbf{24}_2$, acoustic signal from the noise source 46 and the secondary sound sources $\mathbf{24}_1$ and $\mathbf{24}_2$ are sequentially collected by a receiver or microphone 50 placed at the control point P and measured values of such input and output signals are used to calculate acoustic transmission characteristics $H_0(z)$, $H_1(z)$ and $H_2(z)$ from the noise source 46 and the secondary sound sources $\mathbf{24}_1$ and $\mathbf{24}_2$ to the control point P. In the coefficient calculating part 45 the transfer functions $C_1(z)$ and $C_2(z)$ of the filters $\mathbf{48}_1$ and $\mathbf{48}_2$ which satisfy Eq. (14) are calculated from the acoustic transmission characteristics $H_0(z)$, $H_1(z)$ and $H_2(z)$ and the transfer functions are set in the filters $\mathbf{48}_1$ and $\mathbf{48}_2$.

As mentioned above, the active noise controller calls for the simulation of the transmission characteristics $H_1(z)$ and $H_2(z)$ to obtain the filter coefficients $C_1(z)$ and $C_2(z)$ which are necessary for removing noise. This method is, however, defective in that the computational load for obtaining the filter coefficients $C_1(z)$ and $C_2(z)$ which satisfy Eq. (14) increases in proportion to the squares of the orders of the pre-measured and simulated transmission characteristics $H_1(z)$ and $H_2(z)$.

SUMMARY OF THE INVENTION

It is therefore an object of the present invention to provide an acoustic transfer function simulating method which permits the computation of the transfer function of a filter which simulates a desired acoustic transfer function with a small computational load and consequently in a short time.

Another object of the present invention is to provide a simulator using the above-said acoustic transfer function simulating method.

According to the present invention, a plurality of acoustic transfer functions are measured by use of sound source means and receiver means disposed at a plurality of different positions in an acoustic system. The plurality of thus measured acoustic transfer functions are used to estimate physical poles of the acoustic system. Then, coefficients corresponding to the estimated poles are fixedly set in AR filter means and coefficients of MA filter which constitutes an ARMA filter together with the AR filter means are controlled to simulate the desired acoustic transfer function by the transfer function of the ARMA filter.

With such a construction of the present invention, it is possible to simulate an acoustic transfer function with a filter having a small number of coefficients to be controlled, to reduce the computational load and improve the adaptive estimation capability of a device which simulates the acoustic transfer function, such as an echo canceller, sound image localization simulator, dereverberator or active noise controller, and to decrease the quantity of data necessary for storing a plurality of acoustic transfer functions.

DESCRIPTION OF THE PREFERRED EMBODIMENTS

The principles of the method and apparatus for simulating acoustic transfer functions according to the present invention are based on the acoustical finding that acoustic transfer functions or transmission characteristics in the same acoustic system have, in common to them, poles inherent in the acoustic system (which correspond to resonance frequencies of the acoustic system and their Q-factors and which will hereinafter be referred to as physical poles) irrespective of sound source and receiver positions. In individual acoustic transfer functions, the positions of poles in Z-plane and the number of physical poles which can be estimated in practice greatly differ due to the influence of zeros, and it is difficult to observe and estimate such physical poles, based only on a single acoustic transfer function. In view of this, the present invention assumes that each acoustic transfer function is the ARMA model, estimates the physical poles from a plurality of acoustic transfer functions and simulates a desired acoustic transfer function on the assumption that the positions and number of such estimated physical poles are fixed. According to the present invention, a plurality of acoustic transfer functions $H'_j(z)$ (j=1, 2, . . . , k) observed at different source and receiver positions are each composed of a fixed characteristics A'(z) having estimated physical poles and a characteristics $B'_j(z)$ variable with source and receiver positions and expressed as follows:

$$H'_j(z)=B'_j(z)/A'(z) \quad (j=1, 2, \ldots, k)$$

Now, a description will be given, with reference to simulation experiments, of the estimation of physical poles from a plurality of acoustic transfer functions by use of the ARMA modeling technique. In the simulation experiments a simple rectangular parallelepipedic sound field measuring $6.7\times4.3\times3.1$ m$^3$ was assumed as the acoustic system and physical poles were acoustically calculated on the assumption on the reverberation time of the acoustic system was fixed (0.6 sec). In the following, values of physical poles obtained as mentioned above will be referred to as the theoretical physical poles. Next, impulse responses $h_j(t)$ of the k acoustic transfer functions $H_j(z)$ ($j=1, 2, \ldots, k$) in the acoustic system were computed by a mirror image method and normal equations (Wiener-Hopf eq.) obtained by applying the computed results to the afore-mentioned Eq. (10) were solved to obtain ARMA coefficients $a'_{jn}$ and $b'_{jn}$. Then the AR coefficients $a'_{jn}$ were used to factorize the polynomial in the denominator of Eq. (4), whereby were calculated poles $Z_{p'ji}$ ($j=1, 2, \ldots, k$) of Eq. (5).

Figure 8:
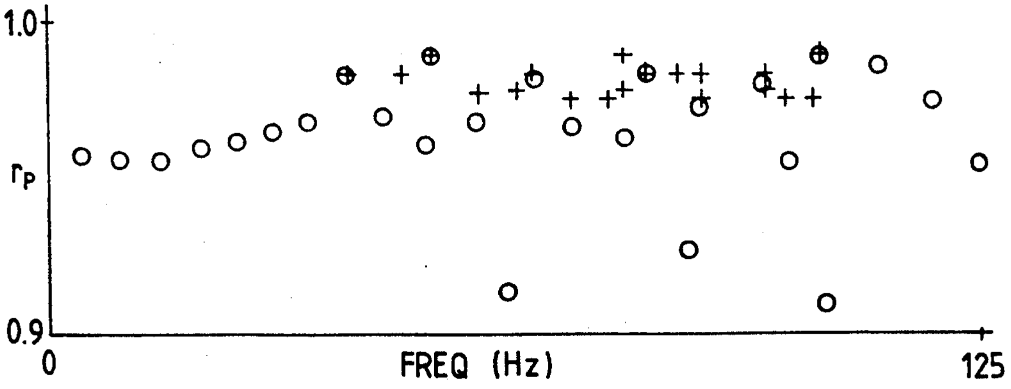
FIG. 8 is a graph showing, in comparison, poles calculated from a single acoustic transfer function and theoretically known physical poles.

FIG. 8 shows, in comparison, theoretical values of physical poles and poles estimated from a single acoustic transfer function ($k=1$) by use of Eq. (10). The effective band ranges from 40 to 110 Hz and low and high frequencies are rejected by filters. The ordinate represents the absolute values $r_p$ of poles represented in the following complex form and the abscissa represents frequency ($\omega_p/2\pi$).

$$Z_p = r_p \exp(-i\omega_p t) \tag{15}$$

As the absolute value $r_p$ approaches 1, the Q-factors of resonance frequencies increase. In FIG. 8 white circles indicate poles estimated from a single acoustic transfer function and crosses theoretical values of physical poles. It is seen from FIG. 8 that the physical poles cannot sufficiently be estimated from only one transfer function and that poles other than the physical ones are also misestimated.

Figure 9A:
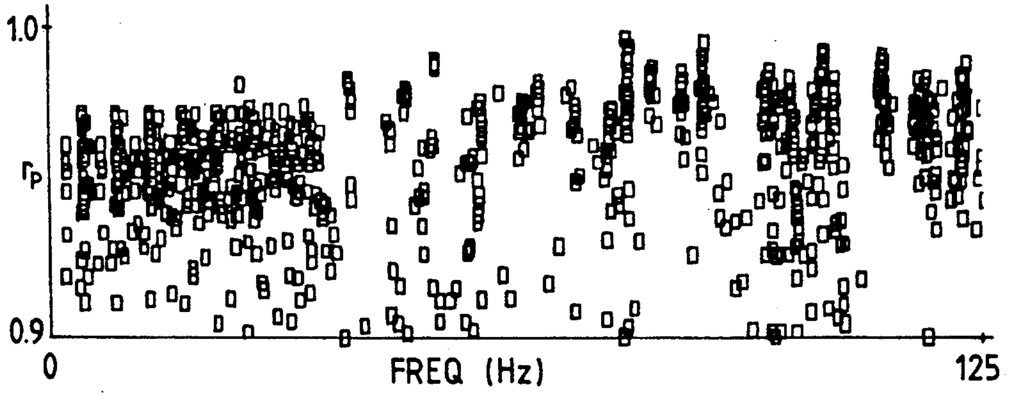
FIG. 9A is a graph showing poles estimated from 50 acoustic transfer functions.
Figure 9B:
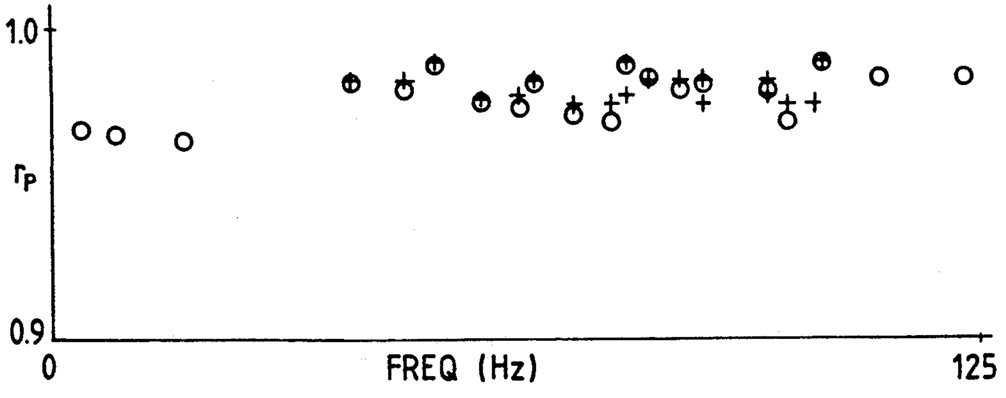
FIG. 9B is a graph showing, in comparison, estimated physical poles and theoretically known physical poles.

FIG. 9A shows poles calculated from an ARMA model for each of 50 acoustic transfer functions for different source and receiver positions, with $k=50$. The ordinate represents the absolute value $r_p$ and the abscissa frequency. In FIG. 9B white circles each indicate, as an estimated position of the physical pole for each frequency, the same position on which, for example, 20 or more poles concentrate in FIG. 9A, and crosses indicate the theoretical values of the physical poles shown in FIG. 8. In FIG. 9B the theoretical values of the physical poles indicated by the crosses and the estimated poles indicated by the white circles substantially agree with each other, from which it can be understood that an excellent estimation of physical poles can be made by use of the ARMA modeling technique for a plurality of acoustic transfer functions.

Figure 10:
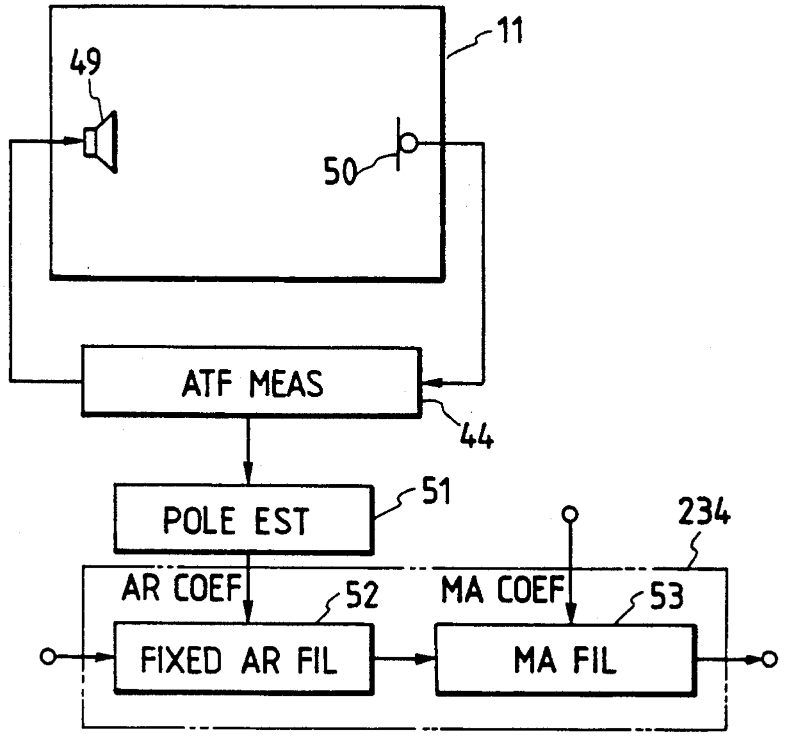
FIG. 10 is a block diagram illustrating the acoustic transfer function simulator according to the present invention.

FIG. 10 illustrates in block form the acoustic transfer function simulator according to the present invention. In the sound field 11 a loudspeaker 49 as a sound source and a microphone 50 as a receiver are arranged and the acoustic transfer function between them is measured by the acoustic transfer function measuring part 44.

In this instance, the acoustic transfer function $H_j(z)$ ($j=1, 2, 3, \ldots, k$) is measured for each of k different arrangements of the sound source 49 and the receiver 50. More specifically, an impulse response, for example, is measured for each arrangement of the sound source 49 and the receiver 50 and provided to the acoustic transfer function measuring part 44 to obtain an impulse response $h'_{jn}(t)$ of the transfer function $H_j(z)$. Next, k acoustic transfer functions $H_j(z)$ thus measured are provided to a pole estimation part 51, wherein physical poles are estimated from the k impulse responses $h'_{jn}(t)$. Various acoustic transfer function simulators according to the present invention, described later on, are also exactly identical in the arrangement for estimating physical poles.

Now, a description will be given of concrete methods for estimating physical poles.

First Estimation Method

This method is the method described above in respect of FIGS. 9A and 9B. That is, a set of ARMA coefficients are obtained for each of the respective acoustic transfer functions $H_j(z)$, each set of the AR coefficients are factorized to obtain poles, and physical poles are estimated on the basis of the degree of concentration of the poles. This method is not necessarily a simple and easy method, because it is necessary to obtain by a trial and error method a reference value for determining the degree of concentration of poles.

Second and third pole estimation methods will be described below in which physical poles are estimated in the form of AR coefficients equivalent to information on the poles. The equivalence between the pole information and the AR coefficients can be understood from the comparison of Eqs. (4) and (5) as referred to previously. These methods make use of the fact that poles common to a plurality of acoustic transfer functions are emphasized by an averaging operation concerning the plural transfer functions.

Second Estimation Method

According to this method, AR coefficients $a'_{jn}$ calculated by use of Eq. (10) from the impulse responses $h'_{jn}(t)$ of the respective acoustic transfer functions $H_j(z)$ are subjected to the following averaging operation to obtain averaged AR coefficients $a_{av'n}$, which are used as estimated values.

$$a_{av'n} = \frac{1}{k}\sum_{j=1}^{k} a'_{jn} \tag{16}$$

This method is advantageous in that the computation for estimating poles is simple and easy.

Third Estimation Method

In this method AR coefficients calculated for respective acoustic transfer functions $H_j(z)$ are expanded to MA coefficients and then averaged and the results are converted again to the AR coefficients, which are used as estimated values. Acoustic transfer functions $A_{av'}(z)$ having thus estimated AR coefficients bear the following relation when the denominator term of each acoustic transfer function $H_i(z)$ is expressed by $A'_i(z)$.

$$\frac{1}{A_{av'}(z)} = \frac{1}{k}\sum_{j=1}^{k}\frac{1}{A'_j(z)} \tag{17}$$

This method needs a larger computational load than does the second method but is expected to decrease estimation error.

Fourth Estimation Method

In this method it is assumed that a plurality of acoustic transfer functions have common poles (i.e. common AR coefficients), and poles are estimated directly from the input-output relationships of the plurality of transfer functions, without obtaining individual AR coefficients. More specifically, the input-output relationships of k simulation transfer functions are expressed by use of common AR coefficients $a_{c'n}$ as follows:

$$y'_j(t) = \sum_{n=1}^{P} a_c'{}_n y'_j(t-n) + \sum_{n=0}^{Q} b'_{jn} x(t-n) \qquad (18)$$

$$j = 1, 2, \ldots, k$$

The common AR coefficients $a_c'{}_n$ are estimated by use of a normal equation or adaptive algorithm in such a manner as to minimize the sum of squared errors between simulated and true outputs $y'_j(t)$ and $y_j(t)$ for all values j from a time point t=0 to a time point N when the acoustic characteristics were each measured, that is, to minimize the sum total $\epsilon$ of squared errors which are calculated by the following equation:

$$\epsilon = \sum_{j=1}^{k} \sum_{t=0}^{N} \{y_j(t) - y'_j(t)\}^2 \qquad (19)$$

In this instance, the true output $y_j(t)$ may also be used as a substitute for the simulated output $y'_j(t)$ on the right-hand side of Eq. (18) in the interests of simplification of the problem, thus obtaining the following equation:

$$\epsilon = \sum_{j=1}^{k} \sum_{t=0}^{N} \left\{ \sum_{n=1}^{P} a_c'{}_n y_j(t-n) + \sum_{n=0}^{Q} b'_{jn} x(t-n) - y_j(t) \right\}^2 \qquad (19')$$

The fixed AR coefficients $a_c'{}_n$ can be determined which minimize Eq. (19').

Now, consider the case where each impulse response $h_j(t)$ (t=0, 1, . . . , L, L being an impulse response length) is preknown by measuring each true acoustic transfer function $H_j(z)$. In this case, the input signal x(t) is expressed by a delta function δ(t) and the true output $y_j(t)$ is expressed by hj(t). Assuming that the output $y'_j(t)$ of the simulated transfer function matches the true output $h_j(t)$, it can be expressed as follows:

$$h_j(t) = \sum_{n=1}^{P} a_c'{}_n h_j(t-n) + \sum_{n=0}^{Q} b'_{jn} \delta(t-n) \qquad (20)$$

$$j = 1, 2, \ldots, k$$

It is necessary that Eq. (20) satisfy all j's and all impulse response lengths from time t=0 to L. This can be represented in the following matrix.

$$\begin{bmatrix} h_1(0) \\ h_1(1) \\ \vdots \\ h_1(L) \\ h_2(0) \\ h_2(1) \\ \vdots \\ h_2(L) \\ \vdots \\ h_k(0) \\ h_k(1) \\ \vdots \\ h_k(L) \end{bmatrix} = \begin{bmatrix} & & & 1 & & & \\ h_1(1) & & & & 1 & & \\ hd_1(2)h_1(1) & & & & \ddots & & \\ \vdots & & & & & 1 & \\ h_1(L-1)h_1(L-2)\ldots h_1(L-P) & & & & & & \\ h_2(1) & & & 1 & & & \\ h_2(2)h_2(1) & & & 1 & & & \\ \vdots & & & \ddots & & & \\ h_2(L-1)h_2(L-2)\ldots h_2(L-P) & & & 1 & & & \\ \vdots & & & & \vdots & & \\ h_k(1) & & & & & 1 & \\ h_k(2)h_k(1) & & & & & 1 & \\ \vdots & & & & & \ddots & \\ h_k(L-1)h_k(L-2)\ldots h_k(L-P) & & & & & 1 & \end{bmatrix} \begin{bmatrix} a_c'{}_1 \\ a_c'{}_2 \\ \vdots \\ a_c'{}_P \\ b'_{10} \\ b'_{11} \\ \vdots \\ b'_{1Q} \\ b'_{20} \\ b'_{21} \\ \vdots \\ b'_{2Q} \\ \vdots \\ b'_{k0} \\ b'_{k1} \\ \vdots \\ b'_{kQ} \end{bmatrix} \qquad (21)$$

Since Eq. (21) is an inconsistent equation, there do not exist coefficients $a_c'{}_n$ and $b'_{jn}$ that satisfy Eq. (21), by representing Eq. (21) in the form of a vector $$U = W\phi \qquad (22)$$

the least squares solution of the coefficient $a_c'{}_n$ can be obtained as follows:

$$\phi = \{(W)^T W\}^{-1} (W)^T U \qquad (23)$$

where T represents a transposition.

With this method, the computational load becomes larger than those needed in the second and third methods when the number of acoustic transfer functions is large, but in the case of using the AR coefficients $a_c'{}_n$ as fixed values, the MA coefficients for simulating the acoustic transfer function can also be computed simultaneously with the AR coefficients. In this case, however, the MA coefficients may also be re-computed for each acoustic transfer function such that each of the squared errors $\epsilon_j$ defined by the following Eq. (19") is minimized:

$$\epsilon_j = \sum_{t=0}^{N} \left\{ \sum_{n=1}^{P} a_c'{}_n y_j(t-n) + \sum_{n=0}^{Q} b'_{jn} x(t-n) - y_j(t) \right\}^2 \qquad (19'')$$

$$\text{where } j = 1, 2, \ldots, k$$

The above-described four pole estimation methods each have both advantages and disadvantages, and hence it is necessary to select the most suited one of them according to each practical use. It is also possible to employ other pole estimation methods. No matter which method may be used, estimation errors (such as an error in the estimation of poles and an error of estimating a plurality of poles of close values as one typical pole) are inevitably induced, and as long as the method used essentially achieves the intended effect of the present invention, the estimated poles and physical poles need not always be in agreement with each other. What is required to ultimately obtain is AR coefficients which are to be set in a fixed AR filter 52 in FIG. 10, but not the values of poles themselves. In other words, the estimation of physical poles in this specification is to estimate AR coefficients corresponding to the physical poles.

The physical poles pre-estimated by the pole estimation part as mentioned above are set in the fixed AR filter 52 which forms an ARMA filter 234 along with a variable MA filter 53. MA coefficients of the variable MA filter 53 are controlled so that the transfer function of the ARMA filter 234 simulates a desired acoustic transfer function. In FIG. 10 the ARMA filter 234 is shown to be formed by a series connection of the AR filter 52 and the MA filter 53 but may also be replaced by such a series-parallel type ARMA filter as described previously Further, the $1/A'(z)$, $A'(z)$ or $(1-A'(z))$ filter can be used as the AR filter 52 according to the acoustic system to which the acoustic transfer function simulator of the present invention is applied.

The mode of use of the acoustic transfer function simulator can be roughly divided into three as described below.

A first mode of use is to estimate and simulate an unknown acoustic transfer function; this is an echo canceller, for example. In this mode of use the AR coefficients determined as mentioned above are fixedly set in the AR filter and the MA coefficients which are applied to the variable MA filter 53 in FIG. 10 are adaptively varied to adaptively simulate the acoustic transfer function.

A second mode of use is that of a sound image localization simulator which prestores a plurality of known acoustic transfer functions and reads them out, as required, to perform simulation. In this mode of use, the MA coefficients for simulating each transfer function $H_j(z)$ with a minimum errors are each calculated in a coefficient calculation part and are stored in a memory (not shown). In the case of employing the afore-said fourth pole estimation method, the MA coefficients are obtained simultaneously with the fixed AR coefficients and hence they are stored in the memory. The MA coefficients thus prestored are read out of the memory, as required, and are applied to a variable MA filter to simulate the acoustic transfer function.

A third mode of use is that of a dereverberator, active noise controller, or the like. This mode of use is not one that is intended to obtain a simulated output of a simulated acoustic transfer function but one that is to utilize the simulated acoustic transfer function after processing it.

In any of the above-mentioned modes of use, physical poles, i.e. the AR coefficients are pre-estimated from a plurality of acoustic transfer functions of an acoustic system. In the estimation and simulation of an unknown acoustic transfer function, since coefficients of the fixed AR filter 52 are obtained in advance, it is necessary only to estimate variable values of the MA model—this will afford reduction of the scale of apparatus used and improve the efficiency of estimation. In the apparatus intended for storage and simulation of acoustic transfer functions, once a set of fixed AR coefficients are obtained, then only MA coefficients need to be stored for a plurality of acoustic transfer functions, accordingly economization of the apparatus can be achieved.

Embodiment in First Mode of Use

Figure 3:
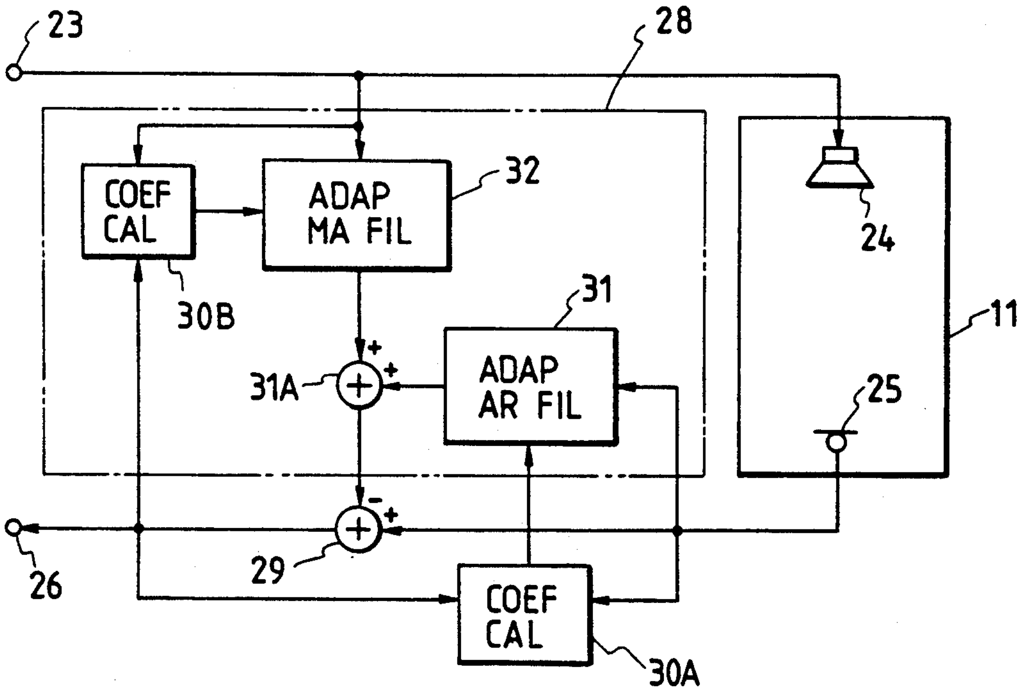
FIG. 3 PRIOR ART
FIG. 3 is a block diagram showing the construction of an echo canceller employing a conventional series-parallel type adaptive ARMA filter.
Figure 11:
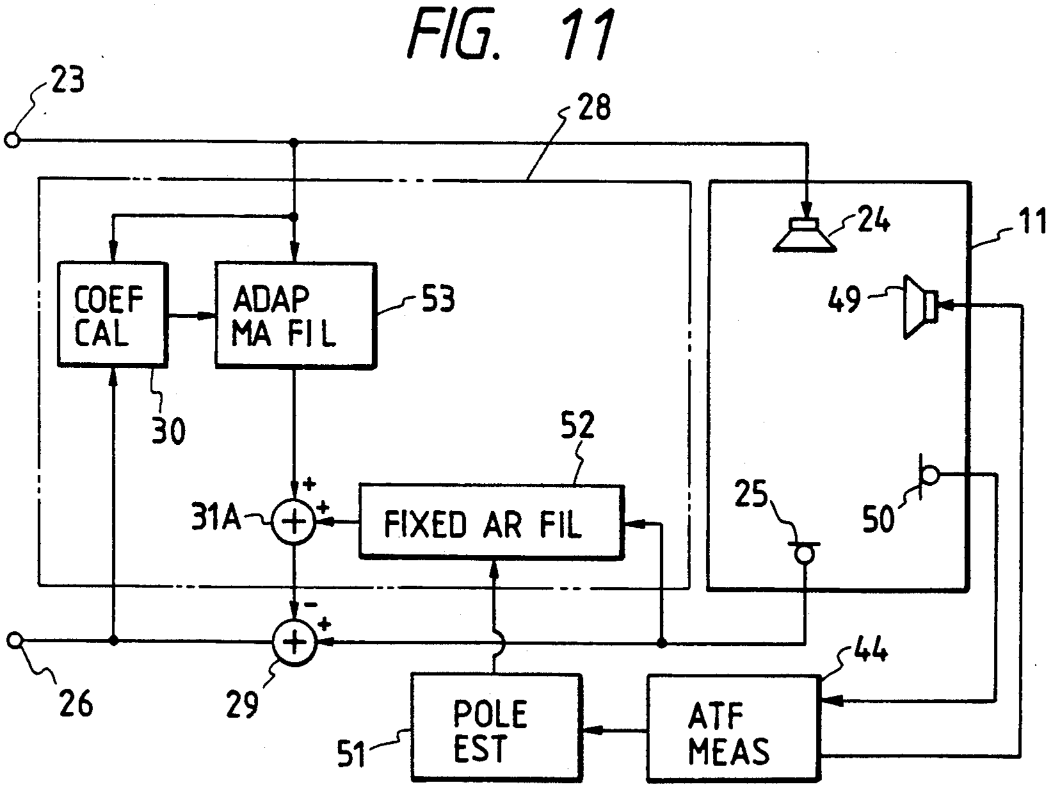
FIG. 11 is a block diagram illustrating an example of the construction of an echo canceller which applies the present invention to the construction of its acoustic transfer function simulation circuit and employs the series-parallel type ARMA filter.

FIG. 11 illustrates an example of the construction of an echo canceller according to the present invention which is applied to the acoustic transfer function simulation circuit 28 of the prior art echo canceller which employs the series-parallel type ARMA filter as shown in FIG. 3. In FIG. 11 the parts corresponding to those in FIG. 3 are identified by the same reference numerals. The adaptive filter 31 in FIG. 3 is substituted by the $(1-A'(z))$ type fixed AR filter 52 and the adaptive MA filter 32 in FIG. 3 by the adaptive MA filter 53. The acoustic output signal of the acoustic system 11, received by the microphone 25, is applied to the fixed AR filter 52, the output of which is added by the adder 31A to the output of the adaptive MA filter 53. The added output is provided as a simulated echo signal to the subtractor 29. The fixed AR filter 52 is supplied with poles, as AR coefficients, which were estimated by any one of the afore-mentioned estimation methods through use of the loudspeaker 49, the microphone 50, the acoustic transfer function measuring part 44 and the pole estimation part 51. After such AR coefficients are thus fixedly set in the AR filter 52, the coefficient calculation part 30 adaptively calculates the MA coefficients so that a subsequent error in the output of the subtractor 29 may be minimized based on received input signal to the input terminal 23 and the output signal of the subtractor 29, the MA coefficients thus calculated being provided to the MA filter 53.

It is a large difference between the echo canceller embodying the present invention, depicted in FIG. 11, and the conventional echo canceller shown in FIG. 3 that the former uses the fixed AR filter 52 in place of the adaptive AR filter 31 used in the latter. On this account, the arrangement according to the present invention involves the estimation of MA coefficients alone, and hence permits the application of a simple algorithm such as the normalized LMS and affords reduction of the computational load for estimation.

Figure 1A:
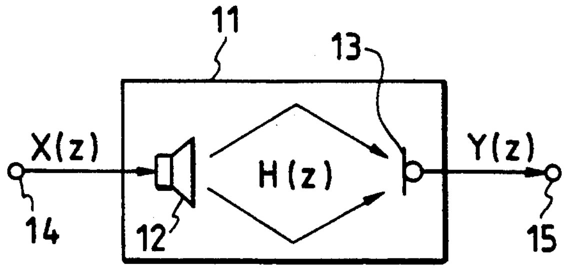
FIG. 1A PRIOR ART
FIG. 1A is a schematic diagram for explaining an acoustic transfer function H(z)
Figure 1B:
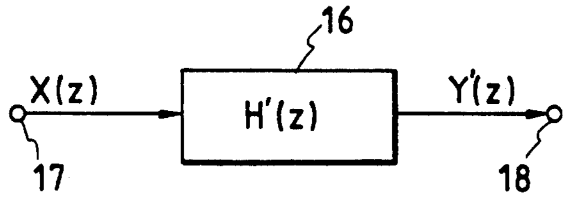
FIG. 1B PRIOR ART
FIG. 1B is a schematic diagram for explaining the simulation of the acoustic transfer function.
Figure 1C:
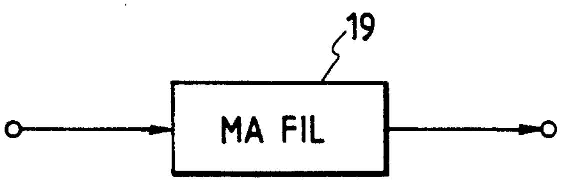
FIG. 1C PRIOR ART
FIG. 1C is a schematic diagram showing an acoustic transfer function simulating method employing an MA filter.
Figure 1D:
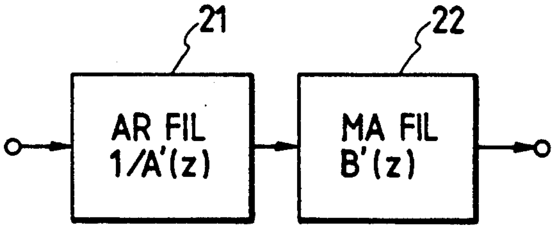
FIG. 1D PRIOR ART
FIG. 1D is a schematic diagram showing an acoustic transfer function simulating method employing an ARMA filter.
Figure 2:
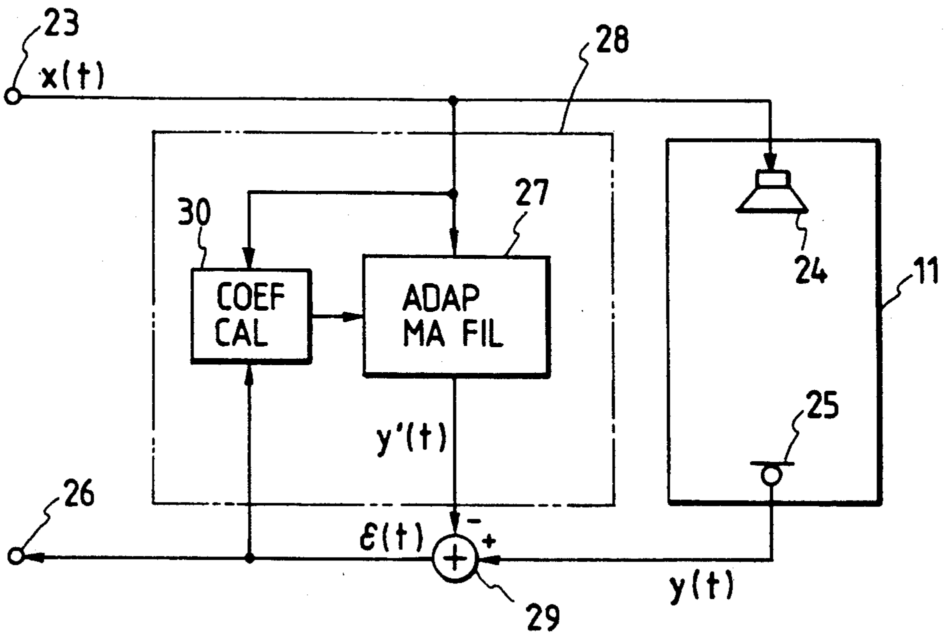
FIG. 2 PRIOR ART
FIG. 2 is a block diagram showing the construction of an echo canceller employing a conventional adaptive MA filter.

Moreover, the echo canceller embodying the present invention is advantageous in that the orders of filters to be adapted can be reduced substantially, as compared with the conventional echo canceller employing only the adaptive MA filter as depicted in FIG. 2. This advantage was confirmed by experiments, which will hereinbelow be described. In the experiments the series-parallel type echo canceller shown in FIG. 11 was used.

The experiments were conducted by simulation, using room acoustic transfer functions (impulse responses) in the frequency band from 60 to 800 Hz which were measured in a room (measuring $6.7\times4.3\times3.1$ $m^3$ with a reverberation time of 0.6 sec). The received input signal used was white noise. The coefficients of the fixed AR filter 52 in the echo canceller were obtained by the afore-mentioned second physical pole estimation method by which acoustic transfer functions were measured for 10 different positions of the loudspeaker 49 and the microphone 50 and the AR coefficients obtained for the respective acoustic transfer functions were averaged. In the evaluation acoustic transfer functions were used which were different from the 10 acoustic transfer function used for obtaining the fixed AR filter coefficients. The adaptive algorithm used was the normalized LMS algorithm.

The orders P and Q of the fixed AR filter 52 and the adaptive MA filter 53 in the echo canceller according to the present invention were set to 250 and 450, respectively, and as a result, a steady-state echo return loss enhancement (ERLE) of 35 dB was obtained. Next, the steady-state ERLE was measured for different orders L of the filter 27 in the echo canceller shown in FIG. 2. (A increase in L will cause an increase in the steady-state ERLE.) As is the case with the echo canceller according to the present invention, the order of the filter 27 necessary for obtaining the steady-state ERLE of 35 dB was 800.

Usually, the computational load for filtering which is performed by adaptively changing coefficients in the coefficient calculation part 30 is more than several times as much as the computational load for fixed filtering. Hence, according to the simulation experiments, the order of the adaptive filter necessary for achieving the simulation of the acoustic transfer function with the same steady-state ERLE and consequently with the same accuracy was the order of 800 in the case of employing the conventional adaptive MA filter alone but 450 in the case of utilizing the present invention; namely, the experiments demonstrate that the invention affords a substantial reduction of the computational load In addition, the reduction in the order of the adaptive filter will improve the convergence speed as well which is an important factor in the performance of the echo canceller, as described below.

Figure 12:
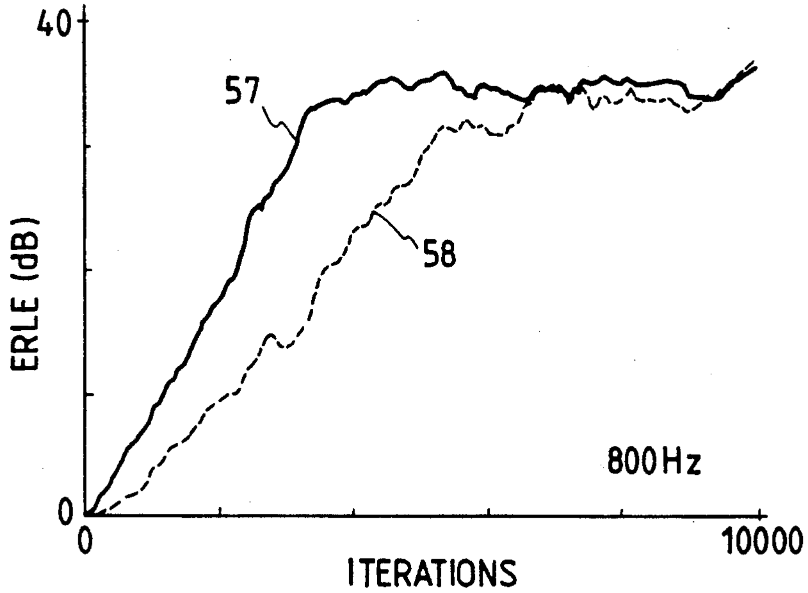
FIG. 12 is a graph showing, in comparison, convergence characteristics for echo cancellation of an echo canceller utilizing the conventional adaptive MA filter and an echo canceller embodying the present invention.

FIG. 12 shows the convergence characteristics of the ERLE obtained with the above-mentioned experiments. The ordinate represents the echo return loss enhancement (ERLE) and the abscissa iterations. The curve 57 indicates the convergence characteristics of the ERLE of the echo canceller according to the present invention (P=250, Q=450) and the curve 58 the convergence characteristics of the ERLE of the conventional echo canceller employing the adaptive MA filter (N=800). It is seen from FIG. 12 that although the steady-state ERLEs of the echo cancellers are both about 35 dB, the convergence speed (at which the steady-state ERLE is reached) of the echo canceller according to the present invention is about 1.5 times faster than that of the conventional echo canceller.

As will be appreciated from the above, the echo canceller employing the acoustic transfer function estimating method of the present invention, which uses the AR coefficients corresponding to physical poles as the coefficients of the fixed AR filter 52, is far smaller in the adaptive MA filter order than the conventional echo canceller employing the adaptive MA filter alone. As the result of this, it is possible to reduce the scale of the echo canceller which has been left unsolved so far and to raise the convergence speed during adaptive estimation which is another serious problem of the prior art.

As compared with the conventional echo canceller using the adaptive ARMA filter, according to the echo canceller of the present invention, the characteristics of the AR filter need not be varied, the adaptive algorithm used is simple and the convergence of the ERLE is fast.

Figure 4:
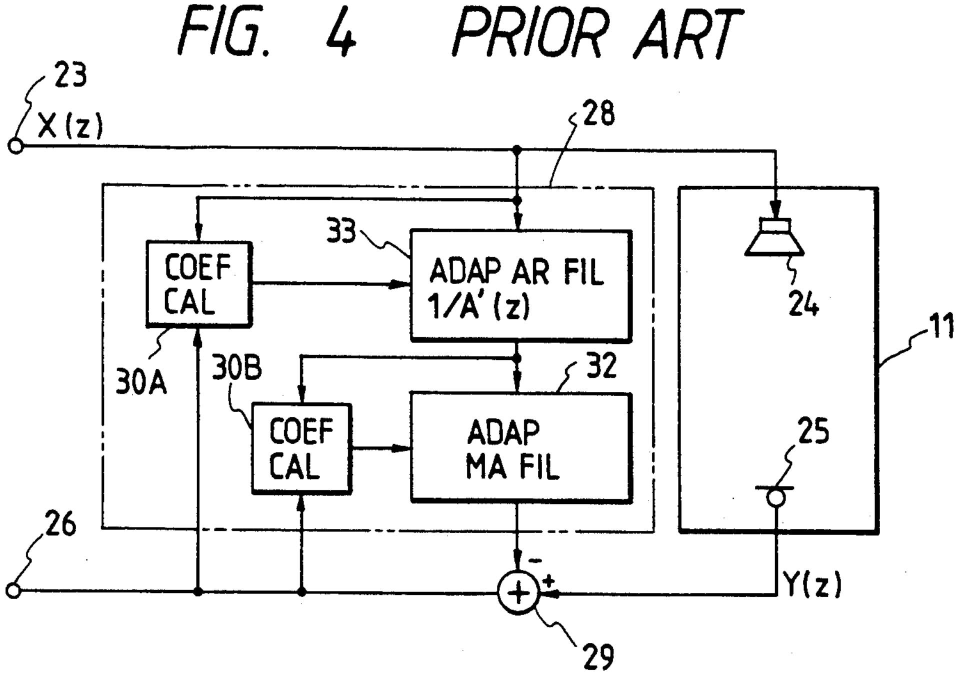
FIG. 4 PRIOR ART
FIG. 4 is a block diagram showing the construction of an echo canceller employing a conventional parallel type adaptive ARMA filter.
Figure 13:
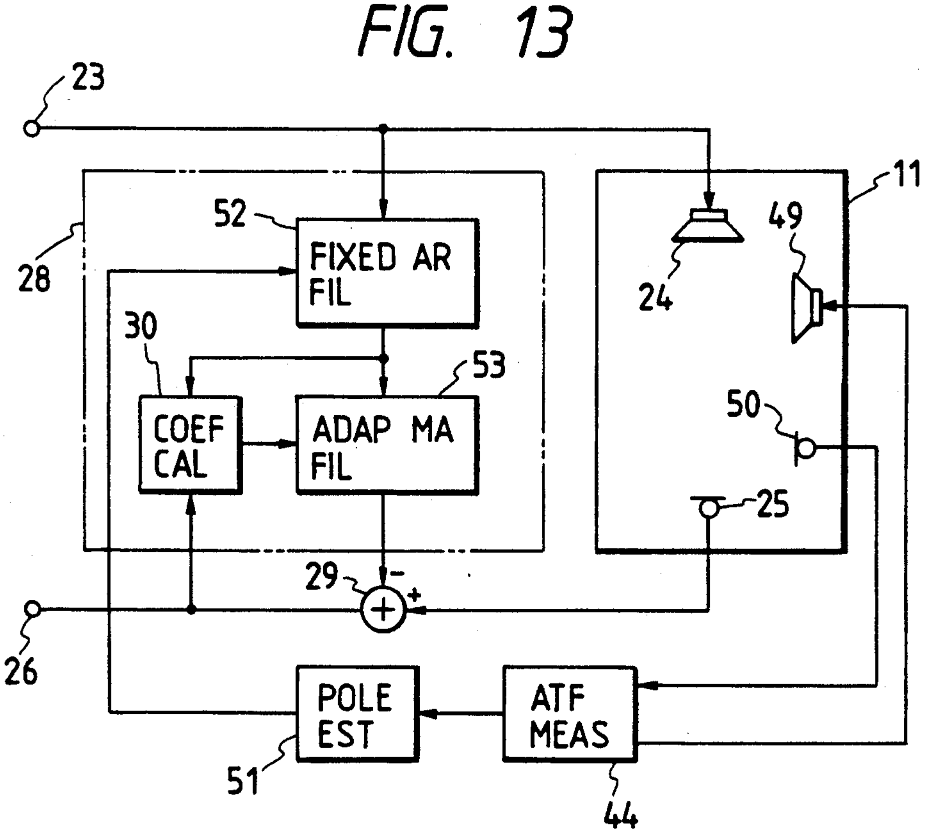
FIG. 13 is a block diagram illustrating an example of the construction of an echo canceller which applies the present invention to the construction of its acoustic transfer function simulation circuit and utilizes the parallel type ARMA filter.

The present invention is also applicable to the echo canceller which employs the parallel type ARMA filter as shown in FIG. 4. FIG. 13 illustrates an example of such an application. In this case, the fixed AR filter 52 is the 1/A'(z) type filter as is the case with the filter 33 in FIG. 4, but its coefficients are fixed coefficients determined on the basis of physical poles estimated as described above. With such an arrangement, too, it is possible to obtain the same results as those described above.

Embodiment in Second Mode of Use

Figure 5:
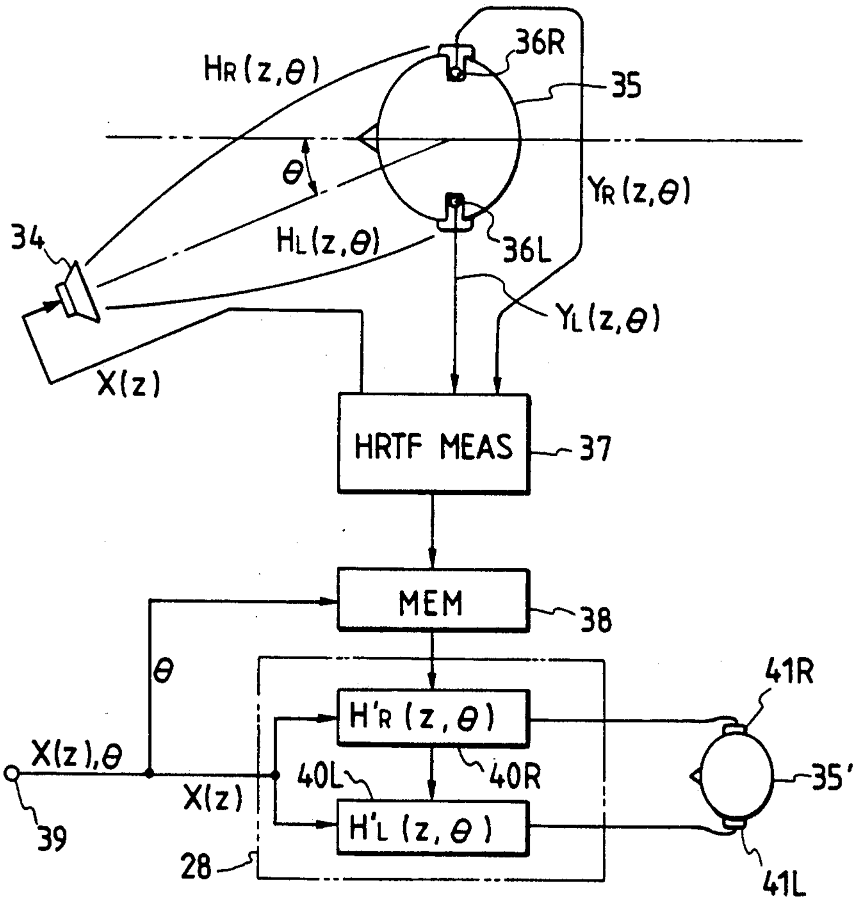
FIG. 5 PRIOR ART
FIG. 5 Is a block diagram showing a conventional sound image localization simulator.
Figure 14:
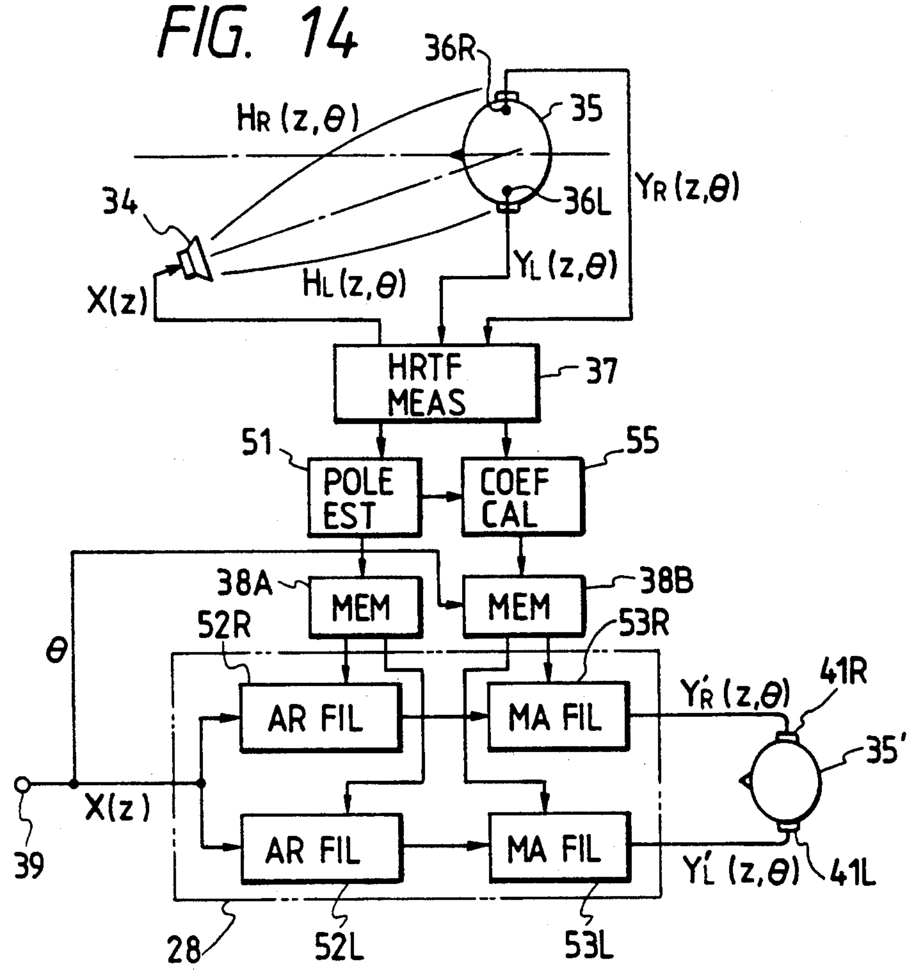
FIG. 14 is a block diagram illustrating an example of the construction of a sound image localization simulator embodying the present invention.

FIG. 14 illustrates in block form an example of the sound image localization simulator according to the present invention. In FIG. 14 the parts corresponding to those in FIG. 5 are identified by the same reference numerals. Physical factors that determine the head-related transfer function (HRTF) are a delay difference based on a difference between the distances from the sound source to the ears, the diffraction of sound waves by the head and the resonance of the external ear and the ear canal. Of them, the delay difference and the diffraction change with the sound source direction, but it is considered that the physical poles which determine the effect of resonance, in the external ear and the ear canal are basically invariable, i.e., the resonance characteristics of the resonance system composed of the external ear and the ear canal are invariable. Hence, a first step for operating the sound image localization simulator according to the present invention is to measure, by the head-related transfer function measuring device 37, right and left head-related transfer functions for a plurality of sound source directions $\theta$ relative to the right and left ears as is the case with the conventional sound image localization simulator. Then, the head-related transfer functions thus measured for the plurality of sound source directions $\theta$ are used to estimate physical poles by the pole estimation part 51 with respect to each of the right and left ears through use of, for instance, the fourth pole estimation method described previously. The physical poles thus estimated are stored in a memory 38A as coefficients $a'_{Rn}$ and $a'_{Ln}$ of AR filters 54R and 54L whose transfer functions are $1/A_R(z)$ and $1/A_L(z)$, respectively. Next, an MA coefficient calculation part 55 calculates MA coefficients $b'_{Rn}(\theta)$ of an MA filter 53R of a transfer function $B'_R(z,\theta)$, using the AR coefficients $a'_{Rn}$ corresponding to the physical poles estimated by the pole estimation part 51 and an impulse response $h'_R(t,\theta)$ of the head-related transfer function $H'_R(z,\theta)$ for each sound-source direction $\theta$. More specifically, the MA coefficients $b'_{Rn}(\theta)$ (n=0, 1, 2, . . . , Q) corresponding to each angular direction $\theta$ are calculated by Eq. (25) as the least square solution which satisfy N simultaneous equations (Eq. (24)) (N being the length of the impulse response $h'_R(t,\theta)$ and N>Q).

$$h'_R(t,\theta) = \sum_{n=1}^{P} a'_{Rn} h'_R(t-n,\theta) + \sum_{n=0}^{Q} b'_{Rn}(\theta)\delta(t-n) \tag{24}$$

$$t = 0, 1, 2, \ldots, N$$

$$b'_{Ri}(\theta) = h'_R(i,\theta) - \sum_{n=1}^{P} a'_{Rn} h'_R(i-n,\theta) \tag{25}$$

$$i = 0, 1, 2, \ldots, Q$$

Similarly, the AR coefficients $a'_{Ln}$ for the left ear and an impulse response $h'_L(t,\theta)$ of the head-related transfer function $H'_L(z,\theta)$ for each sound-source direction $\theta$ are used to calculate MA coefficients $b'_{Li}(\theta)$ for each sound-source direction $\theta$. The MA coefficients thus calculated by the MA coefficient calculation part 55 are stored in a memory 38B.

The localization of a sound image by the sound image localization simulator according to the present invention starts with the application of the right and left AR coefficients read out of the memory 38A to fixed AR filters 54R and 54L. Then a sound-source direction signal $\theta$, applied to the input terminal 39 together with the input signal X(z), is fed as an address to the memory 38B to read out therefrom the right and left MA coefficients corresponding to the sound direction $\theta$, which are set in MA filters 53R and 53L. The input signal X(z) is applied via the AR filters 54R and 54L and the MA filters 53R and 53L to the headphones 41R and 41L, by which the listener localizes the sound image.

As is the case with the afore-mentioned echo canceller, the orders of the MA filters 53R and 53L of the simulator according to the present invention shown in FIG. 14 are far lower than the orders of the filters 40R and 40L of the prior art example depicted in FIG. 5. This permits a substantial reduction of the amount of data on the head-related transfer functions to be stored in the memory 38B.

With the use of the present invention, the amount of data on the head-related transfer functions to be stored can be markedly reduced as mentioned above and since physically fixed values are handled as fixed values in the simulator, a sense of naturalness can be produced in the localization of sound images. With the above-described sound image localization simulator, the head-related transfer functions are measured in an anechoic room as is the case with the prior art example depicted in FIG. 5, but in practical applications of the simulator it is also possible to measure the head-related transfer functions including a room transfer function in an acoustic room, estimate physical poles inherent in the sound field and physical poles inherent in the external ears and the ear canals and then determine the coefficients of the fixed AR filters. In either case, the output of the acoustic transfer function simulation circuit 28 may also be applied to loudspeakers (not shown) disposed apart from the listener 35', not to the headphones 41R and 41L.

Embodiment in Third Mode of Use

As is the case with the above-described embodiments, the present invention is applicable to various acoustic signal processors which process and then utilize simulated acoustic transfer functions as well as devices which directly simulate acoustic transfer functions. The invention will hereinbelow be described as being applied to a dereverberator. In this instance, a portion common to the two acoustic transfer functions $H_1(z)$ and $H_2(z)$ in the dereverberator of FIG. 6 to reduce the orders of the transfer functions, thereby decreasing the computational load involved.

Figure 6:
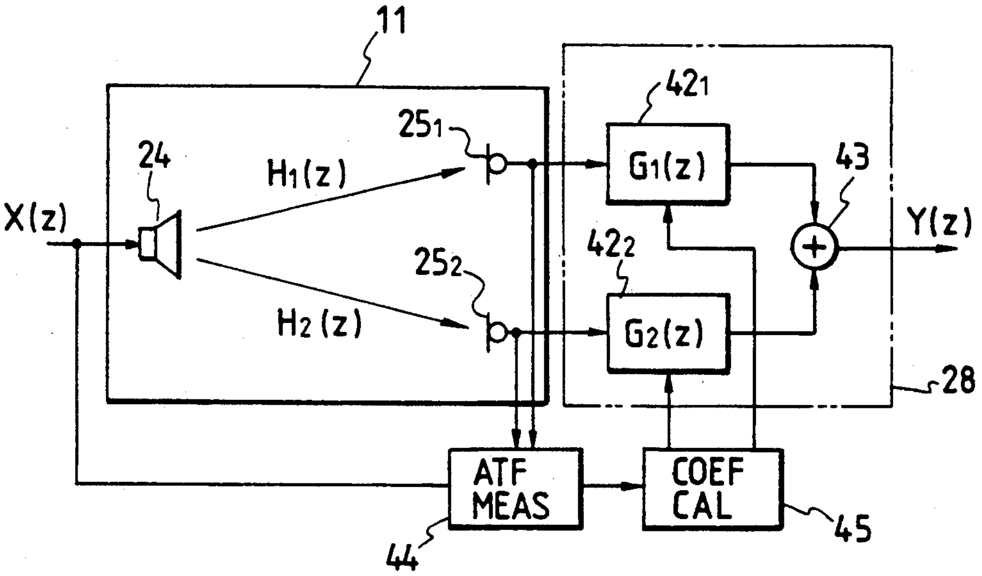
FIG. 6 PRIOR ART
FIG. 6 is a block diagram showing a conventional dereverberator.
Figure 15:
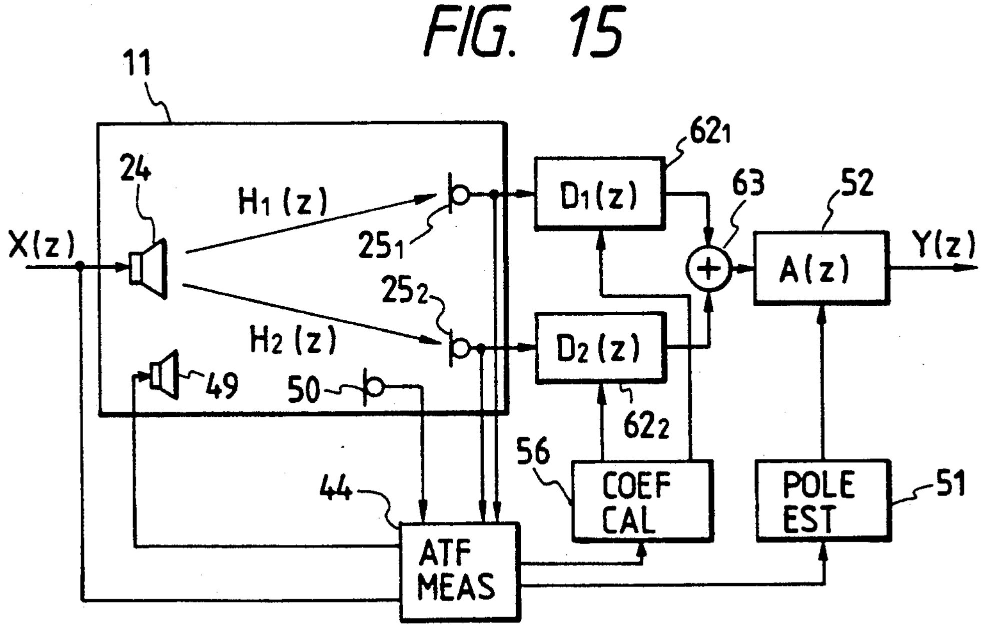
FIG. 15 is a block diagram illustrating an example of the construction of a dereverberator embodying the present invention.

FIG. 15 illustrates an example of the present invention as being applied to the dereverberator depicted in FIG. 6. The inputs of first and second dereverberating MA filters $62_1$ and $62_2$ are connected to the receivers $25_1$ and $25_2$, respectively, and the outputs of the filters $62_1$ and $62_2$ are added together by an adder 63, the output of which is applied to an A'(z) type dereverberating AR filter 52.

By the application of the present invention, the acoustic transfer functions $H_1(z)$ and $H_2(z)$ between the loudspeaker 24 and the microphones $25_1$ and $25_2$ of the acoustic system 11 is expressed by an ARMA model having common AR coefficients as follows:

$$H_1(z)=B'_1(z)/A'(z) \tag{26}$$

$$H_2(z)=B'_2(z)/A'(z) \tag{27}$$

The acoustic transfer function between the loudspeaker 49 and the microphone 50 is measured by the acoustic transfer function measuring part 44 for each change of the relative arrangement of the loudspeaker 49 and the microphone 50 to thereby obtain a plurality of acoustic transfer functions. Physical poles are estimated by the pole estimation part 51 from the acoustic transfer functions and AR coefficients are calculated which are to be provided to the fixed AR filter 52. The respective AR and MA coefficients are computed by Eq. (23) through use of the afore-mentioned fourth pole estimation method, for example. At this time, the orders of coefficients $B'_1(z)$ and $B'_2(z)$ (corresponding to Q in Eq. (4)) are greatly reduced, as compared with the order N in the case where the coefficients $H_1(z)$ and $H_2(z)$ are expressed by the MA model according to the prior art method shown in FIG. 6.

The third dereverberating filter 52 in FIG. 15 is an A'(z) type AR filter the coefficients of which are the values of the AR coefficients $a'_n$ computed as mentioned above, and the transfer function of the filter 52 is A'(z). In this case, the output Y(z) is expressed by the following equation (28) through utilization of the relationship between Eqs. (26) and (27).

$$\begin{aligned} Y(z) &= A'(z)\{D_1(z)H_1(z)X(z) + D_2(z)H_2(z)X(z)\} \\ &= \{D_1(z)B'_1(z) + D_2(z)B'_2(z)\}X(z) \end{aligned} \tag{28}$$

By obtaining the MA filters $62_1$ and $62_2$ of the transfer functions $D_1(z)$ and $D_2(z)$ which satisfy the following relationship $$D_1(z)B'_1(z)+D_2(z)B'_2(z)=1 \tag{29}$$

it follows that Y(z)=X(z). Thus, the original signal X(z) is reconstructed. A coefficient calculation part 56 derives $B'_1(z)$ and $B'_2(z)$ in Eqs. (26) and (27) from the measured acoustic transfer functions $H_1(z)$, $H_2(z)$ and A'(z), and then $D_1(z)$ and $D_2(z)$ are calculated which satisfy Eq. (29).

Since Eqs. (29) and (11) are identical in form, $D_1(z)$ and $D_2(z)$ can be computed by the same method as in the prior art method. However, the orders of $B'_1(z)$ and $B'_2(z)$ are remarkably decreased as compared with the orders of $H_1(z)$ and $H_2(z)$ in the conventional method. Hence, the use Of the present invention permits a substantial reduction of the computational load.

Figure 7:
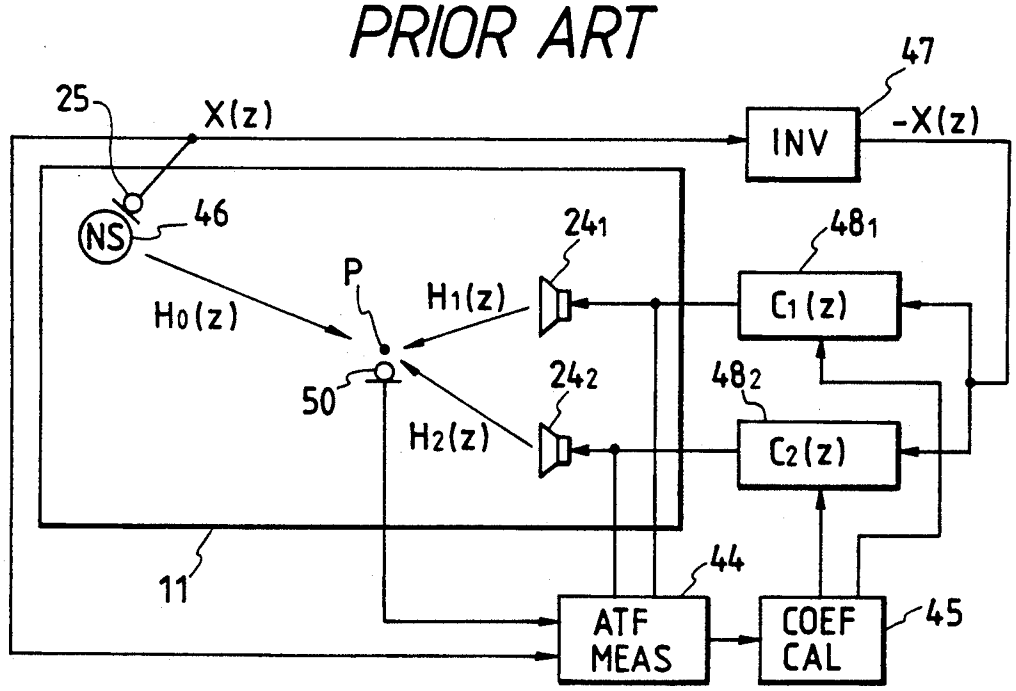
FIG. 7 PRIOR ART
FIG. 7 is a block diagram showing a conventional active noise controller.
Figure 16:
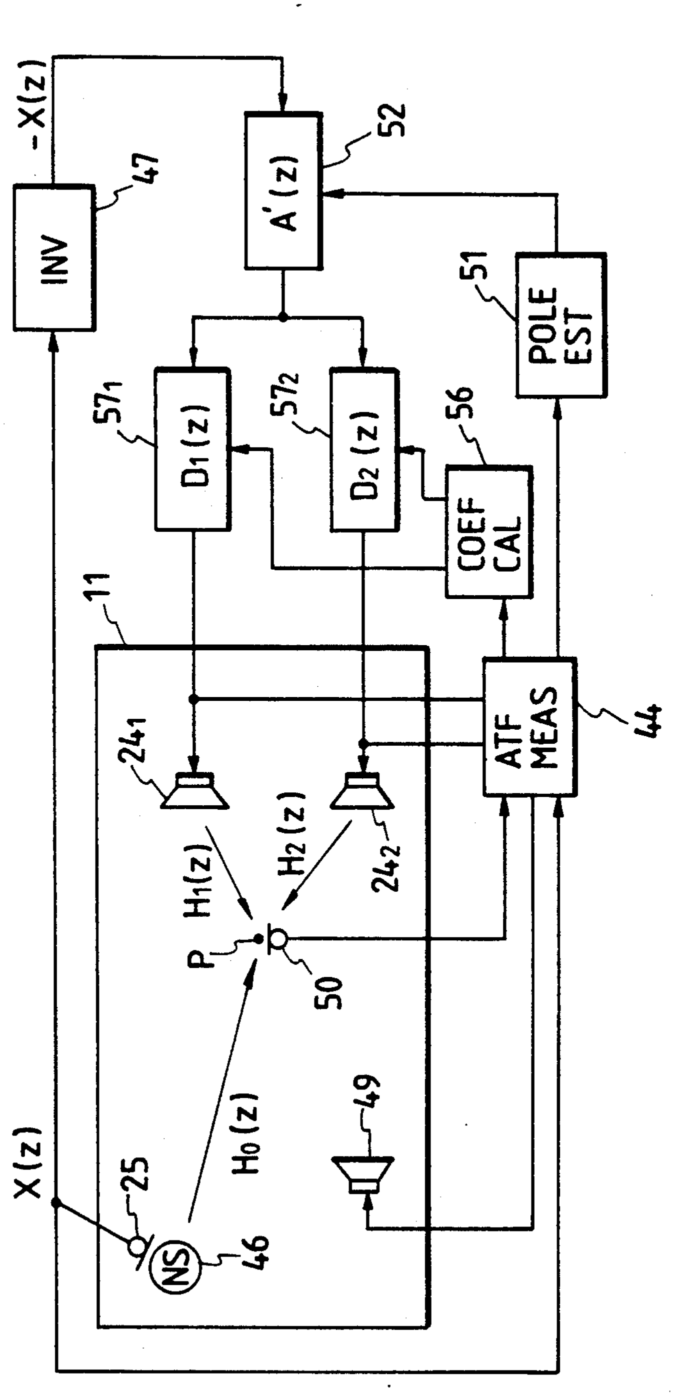
FIG. 16 is a block diagram illustrating an example of the construction of an active noise controller embodying the present invention.

FIG. 16 illustrates another example of the present invention as applied to active noise control. As in the case of FIG. 7, a noise signal X(z) collected by the receiver 25 near the noise source 46 is phase inverted by the phase inverter 47. The phase-inverted signal −X(z) is applied to an A'(z) type fixed AR filter 52, the output of which is provided to MA filters $57_1$ and $57_2$. The outputs of these filters $57_1$ and $57_2$ are supplied to the secondary sound sources $24_1$ and $24_2$ to excite them to produce control sounds. As is the case with FIG. 7, the acoustic transfer function measuring part 44 measures three acoustic transfer function $H_0(z)$, $H_1(z)$ and $H_2(z)$. The fixed AR filter 52 is supplied with A'(z) precomputed by the pole estimation part 51 through use of, for example, the afore-mentioned second pole estimation method.

With the use of the present invention, the acoustic transfer functions $H_1(z)$ and $H_2(z)$ between the secondary sound sources $24_1$, $24_2$ and the control point P are expressed by an ARMA model having common AR coefficients as follows:

$$H_1(z)=B'_1(z)/A'(z) \quad (30)$$

$$H_2(z)=B'_2(z)/A'(z) \quad (31)$$

The respective MA coefficients are calculated using A'(z) computed by the second pole estimation method and Eq. (19''). In this case, the orders of $B'_1(z)$ and $B'_2(z)$ (corresponding to Q in Eq. (4)) are greatly reduced as compared with the orders of $H'_1(z)$ and $H'_2(z)$ expressed by the MA model in the case of the conventional method.

The fixed AR filter 52 in FIG. 16 is an A'(z) type AR filter which has, as its coefficients, the values of the AR coefficients $a'_n$ calculated as mentioned above, and its transfer function is A'(z). In this instance, the observed signal E(z) at the control point P is expressed by the following equation (32) through utilization of the relationship between Eqs. (30) and (31).

$$\begin{aligned} E(z) &= H_0(z)X(z) - A'(z)\{H_1(z)D_1(z)X(z) + H_2(z)D_2(z)X(z)\} \\ &= \{H_0(z) - B'_1(z)D_1(z) - B'_2(z)D_2(z)\}X(z) \end{aligned} \quad (32)$$

By obtaining the transfer functions $D_1(z)$ and $D_2(z)$ of the MA filters which satisfy the following relationship $$D_1(z)B'_1(z)+D_2(z)B'_2(z)=H_0(z) \quad (33)$$

it follows that E(z)=0. Thus, noise control can be effected.

Since Eqs. (33) and (14) are identical in form, $D_1(z)$ and $D_2(z)$ can be calculated by the same method as in the prior art. However, the orders of $B'_1(z)$ and $B'_2(z)$ are remarkably decreased as compared with the orders of $H_1(z)$ and $H_2(z)$ in the prior art method. Hence, the computational load is substantially reduced.

In the above the invention has been described as being applied to active noise control at one control point, and in the case of multipoint control, the reduction of the orders will lead to a substantial reduction of the computational loads, because the computational load is in proportion to the square of the order of the MA type acoustic transfer function which is used for calculation.

As described above, according to the present invention, physical poles of an acoustic system are estimated from a plurality of acoustic transfer functions therein and are used as fixed values of AR filters. By applying the present invention to a device which estimates and simulates unknown acoustic transfer functions, such as an echo canceller, the number of parameters (filter orders) necessary for the estimation can be reduced, and as a result, it is possible to decrease the computational load and increase the estimation speed. By the application of the present invention to a device which stores and simulates a plurality of known acoustic transfer functions, such as a sound image localization simulator, it is possible to reduce the number of parameters necessary for storage, permitting a substantial reduction of the amount of data to be stored. Moreover, acoustic transfer functions simulated (i.e. expressed) according to the present invention can be applied to a dereverberator, a noise controller and various other acoustic signal processors which use such acoustic transfer functions, and the computational load and amount of data to be stored can be reduced. The above-described embodiments have been described on the assumption that the loudspeaker, microphones, etc. for measuring acoustic transfer functions all have flat characteristics, but in practice, the acoustic transfer functions are measured including the characteristics of the loudspeaker and the microphones. It is evident that the principles of the present invention are applicable as well to such a case.

It will be apparent that many modifications and variations may be effected without departing from the scope of the novel concepts of the present invention.

What is claimed is:

1. An acoustic transfer function simulator comprising:

sound source means disposed in an acoustic system, for outputting an acoustic signal;

receiver means disposed at a sound receiving point in said acoustic system, for receiving said acoustic signal from said sound source means;

acoustic transfer function measuring means for measuring acoustic transfer functions between two points at a plurality of different positions in said acoustic system;

pole estimation means whereby inherent AR coefficients corresponding to physical poles inherent in said acoustic system are estimated from said plurality of measured acoustic transfer functions;

ARMA filter means composed of AR filter means and MA filter means, said AR filter means having set therein said inherent AR coefficients estimated by said pole estimation means; and coefficient control means for controlling MA coefficients of said MA filter means so that said ARMA filter means simulates what correspond to said plurality of measured acoustic transfer functions in said acoustic system.

2. The simulator of claim 1 wherein:

said sound source means includes a sound source element for outputting said acoustic signal corresponding to an input signal applied thereto;

the input of said MA filter means is connected to the input of said sound source element; and the input of said AR filter means is connected to the output of said receiver means;

which further comprises adder means for adding together the outputs of said MA filter means and said AR filter means, and subtracting means for outputting an error between the outputs of said receiver means and said adder means; and wherein said coefficient control means is means for adaptively controlling said MA coefficients so that said error may be minimized.

3. The simulator of claim 1 wherein:

said sound source means includes a sound source element for outputting said acoustic signal corresponding to an input signal applied thereto; and said MA filter means and said AR filter means are connected in series to constitute said ARMA filter means, the input of said ARMA filter means being supplied with said input signal;

which further comprises subtractor means for outputting an error between the outputs of said receiver means and said ARMA filter means; and wherein said coefficient control means is means for adaptively controlling said MA coefficients so that said error may be minimized.

4. The simulator of claim 1 wherein:

said coefficient control means includes coefficient calculation means whereby sets of MA coefficients corresponding to said plurality of acoustic transfer functions measured at different positions are calculated from said plurality of acoustic transfer functions, and memory means for storing plural sets of said MA coefficients in correspondence with said different positions; and wherein:

said AR filter means and said MA filter means are connected in series to constitute said ARMA filter means, said ARMA filter means being supplied with an input signal; and said coefficient control means is means whereby a set of said MA coefficients corresponding to a position signal applied thereto together with said input signal is read out of said memory means and set in said MA filter means, by which said ARMA filter means simulates said acoustic transfer function from said sound source means disposed at a position corresponding to said position signal to said sound receiving point.

5. The simulator of claim 1 wherein:

said AR filter means includes first and second AR filters;

said MA filter means includes first and second MA filters connected in series to said first and second AR filters, respectively;

said ARMA filter means includes a first ARMA filter formed by said series-connected first AR filter and first MA filter and a second ARMA filter formed by said series-connected second AR filter and second MA filter;

said receiver means includes first and second receivers fixedly disposed at different positions;

said acoustic transfer function measuring means includes means for measuring first and second acoustic transfer functions from said sound source mean at each of a plurality of positions to said first and second receivers;

said pole estimation means is means whereby first and second ones of said fixed AR coefficients corresponding to first and second physical poles of said acoustic system are estimated from said pluralities of first and second acoustic transfer functions, respectively, said first and second fixed AR coefficients thus estimated being set in said first and second AR filters, respectively;

said coefficient control means includes coefficient calculation means whereby first and second MA coefficients corresponding to each position of said sound source means are calculated, using said first and second fixed AR coefficients, from said first and second acoustic transfer functions corresponding to said each position of said sound source means, and memory means for storing said first and second MA coefficients respectively corresponding to said plurality of positions; and said coefficient control means is means whereby said first and second MA coefficients corresponding to a position signal appended to said input signal applied to said first and second ARMA filters are read out of said memory means and set in said first and second MA filters, first and second acoustic transfer functions from said sound source means disposed at the position corresponding to said position signal to said first and second receivers being simulated on the basis of transfer functions of said first and second ARMA filters.

6. The simulator of claim 1 wherein:

said receiver means includes first and second receiver elements disposed at two sound receiving points in said acoustic system, respectively;

said MA filter means includes first and second MA filters supplied with the outputs of said first and second receiver elements, and adder means for adding together the outputs of said first and second MA filters, the added output being applied to said AR filter;

said acoustic transfer function measuring means is means whereby first and second acoustic transfer functions $H_1(z)$ and $H_2(z)$ from said sound source means to said first and second receiver elements are measured from the input to said sound source means and the outputs from said first and second receiver elements;

said coefficient control means is means for obtaining first and second transfer functions $B'_1(z)$ and $B'_2(z)$ when said first and second acoustic transfer functions were simulated with $H_1(z)=B'_1(z)/A'(z)$ and $H_2(z)=B'_2(z)/A'(z)$ by use of a transfer function $A'(z)$ of said AR filter means, for determining transfer functions $D_1(z)$ and $D_2(z)$ of said first and second MA filters which satisfy the following equation:

$$D_1(z)B'_1(z)+D_2(z)B'_2(z)=1$$

and for setting said transfer functions $D_1(z)$ and $D_2(z)$ in said first and second MA filters, respectively.

7. The simulator of claim 1 which further comprises:

noise detector means disposed near a noise source in said acoustic system, for detecting noise; and phase inverting means for inverting the phase of the detected output of said noise detector means; and wherein:

said sound source means includes first and second sound source elements disposed at two positions in said acoustic system;

said MA filter means includes first and second MA filters supplied with the output of said AR filter means, the outputs of said first and second MA filter means being input into said first and second sound source elements to provide therefrom first and second control sounds, respectively;

said acoustic transfer function measuring means is means in which said receiver means is disposed at said sound receiving point predetermined in said acoustic system and for calculating acoustic transfer functions $H_0(z)$, $H_1(z)$ and $H_2(z)$ from said noise source and said first and second sound sources to said sound receiving point; and said coefficient calculation means is means for obtaining first and second transfer functions $B'_1(z)$ and $B'_2(z)$ when said transfer functions $H_1(z)$ and $H_2(z)$ were simulated with $H_1(z)=B'_1(z)/A'(z)$ and $H_2(z)=B'_2(z)/A'(z)$, respectively, by use of a transfer function $A'(z)$ of said AR filter means, for determining transfer functions $D_1(z)$ and $D_2(z)$ of said first and second MA filters which satisfy the following equation:

$$D_1(z)B'_1(z)+D_2(z)B'_2(z)=H_0(z)$$

and for setting said transfer functions $D_1(z)$ and $D_2(z)$ in said first and second MA filters, respectively.

8. An acoustic transfer function simulation method whereby what corresponds to an acoustic transfer function from a sound source to a sound receiving point in an acoustic system is simulated with a transfer function of ARMA filter means composed of AR filter means and MA filter means, comprising the steps of:

- measuring acoustic transfer functions between two points at different positions in said acoustic system;
- estimating from said measured acoustic transfer functions fixed AR coefficients of said AR filter means corresponding to physical poles of said acoustic system; and
- determining MA coefficients of said MA filter means so that a transfer function of said ARMA filter means composed of said AR filter means and said MA filter means simulates what corresponds to the acoustic transfer function of said acoustic system.

9. The method of claim 8 wherein said fixed AR coefficient estimating step is a step wherein an average of coefficient values corresponding to each order of sets of AR coefficients that said plurality of measured acoustic transfer functions have is obtained as the estimated fixed AR coefficient of each order.

10. The method of claim 8 wherein said fixed AR coefficient estimating step is a step wherein, letting k AR filter transfer functions which are determined from AR coefficients derived from each of k measured acoustic transfer functions be represented by $1/A'_j(z)$, where $j=1, 2, \ldots, k$, coefficients of an average transfer function $A_{av}(z)$, which is calculated from the following equation, is obtained as said fixed AR coefficients of said fixed AR filter:

$$\frac{1}{A_{av}'(z)} = \frac{1}{k} \sum_{j=1}^{k} \frac{1}{A'_j(z)} .$$

11. The method of claim 8 wherein, letting the number of pairs of different positions be represented by k, k being an integer equal to or greater than 2, the order of said AR filter means by P, the order of said MA filter by Q and an integer parameter indicating time by t, said acoustic transfer function measuring step includes a step wherein an acoustic output signal $y_j(t)$ corresponding to an acoustic input signal x(t) between said two points of each of said k pairs of different positions in said acoustic system is measured for each $j=1, 2, \ldots, k$ from time $t=0$ to time N, and said fixed AR coefficient estimating step includes a step wherein said fixed coefficients $a_c'{}_n$, $n=1, 2, \ldots, P$, are calculated which minimize mean squared error expressed by the following equation:

$$\epsilon = \sum_{j=1}^{k} \sum_{t=0}^{N} \left( \sum_{n=1}^{P} a_c'{}_n y_j(t-n) + \sum_{n=0}^{Q} b'_{jn} x_j(t-n) - y_j(t) \right)^2$$

where $b'_{jn}$ are MA coefficients of said MA filter which are simultaneously calculated so as to minimize the value $\epsilon$.

12. The method of claim 11, wherein said MA coefficient determining step includes a step wherein said MA coefficients $b'_{jn}$ are re-calculated which minimize mean squared error $\epsilon_j$ expressed by the following equation:

$$\epsilon_j = \sum_{t=0}^{N} \left( \sum_{n=1}^{P} a_c'{}_n y_j(t-n) + \sum_{n=0}^{Q} b'_{jn} x_j(t-n) - y_j(t) \right)^2$$

where $j = 1, 2, \ldots, k$.

13. The method of claim 11 or 12, wherein said input signal $x_j(t)$ is an impulse signal $\delta(t)$ which has a value 1 at $t=0$, and a value 0 elsewhere.

* * * * *